(12) United States Patent
Rinzler et al.

(10) Patent No.: US 10,181,614 B2
(45) Date of Patent: Jan. 15, 2019

(54) HYDROGEN OXIDATION AND GENERATION OVER CARBON FILMS

(71) Applicant: University of Florida Research Foundation, Incorporated, Gainesville, FL (US)

(72) Inventors: Andrew Gabriel Rinzler, Newberry, FL (US); Rajib Kumar Das, Gainesville, FL (US); Yan Wang, Cambridge, MA (US); Hai-Ping Cheng, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/669,155

(22) Filed: Aug. 4, 2017

(65) Prior Publication Data

US 2018/0019491 A1 Jan. 18, 2018

Related U.S. Application Data

(60) Continuation of application No. 15/173,581, filed on Jun. 3, 2016, now Pat. No. 9,742,018, which is a
(Continued)

(51) Int. Cl.
*H01M 4/00* (2006.01)
*H01M 8/0656* (2016.01)
(Continued)

(52) U.S. Cl.
CPC ........... *H01M 8/0656* (2013.01); *C25B 11/12* (2013.01); *H01M 4/8615* (2013.01); *H01M 4/90* (2013.01);
(Continued)

(58) Field of Classification Search
CPC ..... Y02P 20/133; H01M 4/90; H01M 4/8825; H01M 4/8615; H01M 8/0656; Y02B 90/14; Y02B 90/12
See application file for complete search history.

(56) References Cited

U.S. PATENT DOCUMENTS 4,601,797 A 7/1986 Wagenknecht
4,673,473 A 6/1987 Ang et al.
(Continued)

FOREIGN PATENT DOCUMENTS

CN 1214710 A 4/1999
CN 1386909 A 12/2002
(Continued)

OTHER PUBLICATIONS

Office communication dated Mar. 19, 2015 in connection with Application No. CN 2010800191988.
(Continued)

*Primary Examiner* — Cynthia H Kelly
*Assistant Examiner* — Monique M Wills
(74) *Attorney, Agent, or Firm* — Wolf, Greenfield & Sacks, P.C.

(57) ABSTRACT

An electrode comprises an acid treated, cathodically cycled carbon-comprising film or body. The carbon consists of single walled nanotubes (SWNTs), pyrolytic graphite, microcrystalline graphitic, any carbon that consists of more than 99% $sp^2$ hybridized carbons, or any combination thereof. The electrode can be used in an electrochemical device functioning as an electrolyzer for evolution of hydrogen or as a fuel cell for oxidation of hydrogen. The electrochemical device can be coupled as a secondary energy generator into a system with a primary energy generator that naturally undergoes generation fluctuations. During periods of high energy output, the primary source can power the
(Continued)

electrochemical device to store energy as hydrogen, which can be consumed to generate electricity as the secondary source during low energy output by the primary source. Solar cells, wind turbines and water turbines can act as the primary energy source.

12 Claims, 11 Drawing Sheets

Related U.S. Application Data division of application No. 13/994,906, filed as application No. PCT/US2011/065569 on Dec. 16, 2011, now Pat. No. 9,768,460.

(60) Provisional application No. 61/424,323, filed on Dec. 17, 2010.

(51) Int. Cl.
  *H01M 4/90* (2006.01)
  *H01M 4/96* (2006.01)
  *H01M 8/0234* (2016.01)
  *H01M 8/0239* (2016.01)
  *H01M 8/18* (2006.01)
  *C25B 11/12* (2006.01)
  *H01M 4/86* (2006.01)
  *H01M 4/88* (2006.01)

(52) U.S. Cl.
  CPC ........... *H01M 4/96* (2013.01); *H01M 8/0234* (2013.01); *H01M 8/0239* (2013.01); *H01M 8/186* (2013.01); *H01M 4/8825* (2013.01); *H01M 2250/10* (2013.01); *H01M 2250/402* (2013.01); *Y02B 90/12* (2013.01); *Y02B 90/14* (2013.01); *Y02E 60/528* (2013.01); *Y02P 20/133* (2015.11)

(56) References Cited

U.S. PATENT DOCUMENTS

| | | | |
|---|---|---|---|
| 5,013,339 A | 5/1991 | Mahoney et al. | |
| 5,238,674 A | 8/1993 | Vercoulen et al. | |
| 5,417,757 A | 5/1995 | Merienne et al. | |
| 5,456,943 A | 10/1995 | Guhl et al. | |
| 5,560,898 A | 10/1996 | Uchida et al. | |
| 5,853,877 A | 12/1998 | Shibuta | |
| 6,127,061 A | 10/2000 | Shun et al. | |
| 6,232,706 B1 | 5/2001 | Dai et al. | |
| 6,331,262 B1 | 12/2001 | Haddon et al. | |
| 6,369,934 B1 | 4/2002 | Bechinger et al. | |
| 6,566,983 B2 | 5/2003 | Shin | |
| 6,590,231 B2 | 7/2003 | Watanabe et al. | |
| 6,645,455 B2 | 11/2003 | Margrave et al. | |
| 6,831,017 B1 | 12/2004 | Li et al. | |
| 6,903,365 B1 | 6/2005 | Nihei | |
| 6,936,233 B2 | 8/2005 | Smalley et al. | |
| 7,037,619 B2 | 5/2006 | Yamaura et al. | |
| 7,060,241 B2 | 6/2006 | Glatkowski | |
| 7,122,165 B2 | 10/2006 | Wong et al. | |
| 7,261,852 B2 | 8/2007 | Rinzler et al. | |
| 7,351,444 B2 | 4/2008 | Wang et al. | |
| 7,572,743 B2 | 8/2009 | Rinzler et al. | |
| 7,704,479 B2 | 4/2010 | Rinzler et al. | |
| 7,776,444 B2 | 8/2010 | Rinzler et al. | |
| 7,972,699 B2 | 7/2011 | Rinzler et al. | |
| 8,168,965 B2 | 5/2012 | Rinzler et al. | |
| 8,221,937 B2 | 7/2012 | Dai | |
| 9,368,291 B2 | 6/2016 | Rinzler et al. | |
| 9,742,018 B2 | 8/2017 | Rinzler et al. | |
| 2002/0172639 A1 | 11/2002 | Horiuchi et al. | |
| 2002/0176650 A1 | 11/2002 | Zhao et al. | |
| 2003/0122111 A1 | 7/2003 | Glatkowski | |
| 2004/0066094 A1 | 4/2004 | Suzuki et al. | |
| 2004/0197546 A1 | 10/2004 | Rinzler et al. | |
| 2004/0197638 A1 | 10/2004 | McElrath et al. | |
| 2004/0198850 A1 | 10/2004 | Connor et al. | |
| 2005/0026411 A1 | 2/2005 | Tanamoto et al. | |
| 2005/0098437 A1 | 5/2005 | Shiepe | |
| 2005/0100960 A1 | 5/2005 | Dai et al. | |
| 2005/0142428 A1 | 6/2005 | Daimon et al. | |
| 2005/0147553 A1 | 7/2005 | Wong et al. | |
| 2005/0199894 A1 | 9/2005 | Rinzler et al. | |
| 2005/0202578 A1 | 9/2005 | Yaniv et al. | |
| 2005/0266162 A1 | 12/2005 | Luo et al. | |
| 2006/0029537 A1 | 2/2006 | Zhang et al. | |
| 2006/0172179 A1 | 8/2006 | Gu et al. | |
| 2006/0220251 A1 | 10/2006 | Kloster et al. | |
| 2006/0223991 A1 | 10/2006 | Zhang et al. | |
| 2006/0237805 A1 | 10/2006 | Segal et al. | |
| 2007/0092787 A1 | 4/2007 | Chen | |
| 2007/0114573 A1 | 5/2007 | Han et al. | |
| 2007/0141345 A1 | 6/2007 | Rinzler et al. | |
| 2007/0172718 A1 | 7/2007 | Lee et al. | |
| 2007/0184972 A1 | 8/2007 | Roev et al. | |
| 2008/0020923 A1 | 1/2008 | Debe et al. | |
| 2008/0182155 A1* | 7/2008 | Choi ..................... B01J 21/185 429/482 |
| 2008/0210950 A1 | 9/2008 | Sung | |
| 2009/0136849 A1 | 5/2009 | Yue et al. | |
| 2009/0138649 A1 | 5/2009 | Chew et al. | |
| 2009/0246625 A1 | 10/2009 | Lu | |
| 2010/0097742 A1 | 4/2010 | Adzic et al. | |
| 2010/0272981 A1 | 10/2010 | Rinzler et al. | |
| 2011/0186785 A1 | 8/2011 | Kato et al. | |
| 2012/0031852 A1 | 2/2012 | Aglietto | |
| 2012/0045688 A1 | 2/2012 | Liu et al. | |
| 2012/0115049 A1 | 5/2012 | Rinzler et al. | |
| 2013/0026029 A1 | 1/2013 | Kayeart et al. | |
| 2013/0105304 A1 | 5/2013 | Kaczur et al. | |
| 2013/0146470 A1 | 5/2013 | Wang et al. | |
| 2013/0273446 A1 | 10/2013 | Rinzler et al. | |
| 2014/0083752 A1 | 3/2014 | Walczak et al. | |
| 2016/0185602 A1 | 6/2016 | Walczak et al. | |
| 2016/0192484 A1 | 6/2016 | Walczak et al. | |
| 2016/0281245 A1 | 9/2016 | Rinzler et al. | |
| 2017/0005351 A1 | 1/2017 | Rinzler et al. | |

FOREIGN PATENT DOCUMENTS

| | | |
|---|---|---|
| CN | 1466788 A | 1/2004 |
| CN | 1546431 A | 11/2004 |
| CN | 2893940 Y | 4/2007 |
| CN | 100595953 C | 3/2010 |
| CN | 101721944 A | 6/2010 |
| CN | 103140608 A | 6/2013 |
| CN | 103233240 A | 8/2013 |
| EP | 1 878 763 A2 | 1/2008 |
| JP | H06-038265 U | 5/1994 |
| JP | H07-04811 A | 2/1995 |
| JP | 2000-086216 A | 3/2000 |
| JP | 2000-203821 A | 7/2000 |
| JP | 2001-035362 A | 2/2001 |
| JP | 2002-305087 A | 10/2002 |
| JP | 2002-338221 A | 11/2002 |
| JP | 2002-346996 A | 12/2002 |
| JP | 2003-146632 A | 5/2003 |
| JP | 2003-178816 A | 6/2003 |
| JP | 2003-209270 A | 7/2003 |
| JP | 2003-288835 A | 10/2003 |
| JP | 2004-042253 A | 2/2004 |
| JP | 2004-080987 A | 3/2004 |
| JP | 2004-158290 A | 6/2004 |
| JP | 2004-315297 A | 11/2004 |
| JP | 2004-537174 A | 12/2004 |
| JP | 2005-047763 A | 2/2005 |
| JP | 2005-057012 A | 3/2005 |
| JP | 2005-294109 A | 10/2005 |
| JP | 2006-513557 A | 4/2006 |
| JP | 2006-265151 A | 10/2006 |
| JP | 2007-515364 A | 6/2007 |

(56) References Cited

FOREIGN PATENT DOCUMENTS

| | | | |
|---|---|---|---|
| JP | 2007-214130 A | 8/2007 | |
| JP | 2007-258030 A | 10/2007 | |
| JP | 2007-297644 A | 11/2007 | |
| JP | 2008-505832 A | 2/2008 | |
| JP | 2008-542980 A | 11/2008 | |
| JP | 2009-093983 A | 4/2009 | |
| JP | 2009-533227 A | 9/2009 | |
| JP | 2009-536911 A | 10/2009 | |
| JP | 2009-541198 A | 11/2009 | |
| JP | 2010-506824 A | 3/2010 | |
| JP | 2010-515779 A | 5/2010 | |
| JP | 2010-255018 A | 11/2010 | |
| JP | 2010-232040 A | 4/2012 | |
| JP | 2012-082120 A | 4/2012 | |
| KR | 10-1999-0082415 A | 11/1999 | |
| KR | 10-2001-0101692 | 11/2001 | |
| KR | 10-2007-0730197 B1 | 6/2007 | |
| KR | 2007-0100594 A | 10/2007 | |
| KR | 10-2009-0079935 A | 7/2009 | |
| RU | 2303836 C1 | 7/2007 | |
| WO | WO 97/00925 A1 | 1/1997 | |
| WO | WO 98/25758 A1 | 6/1998 | |
| WO | WO 03/107451 A2 | 12/2003 | |
| WO | WO 2004/009884 A1 | 1/2004 | |
| WO | WO 2004/040590 A2 | 5/2004 | |
| WO | WO 2004/109837 A2 | 12/2004 | |
| WO | WO 2005/014889 A2 | 2/2005 | |
| WO | WO 2005/029528 A1 | 3/2005 | |
| WO | WO 2005/044723 A2 | 5/2005 | |
| WO | WO 2005/083751 A2 | 9/2005 | |
| WO | WO 2006/001790 A1 | 1/2006 | |
| WO | WO 2006/011655 A1 | 2/2006 | |
| WO | WO 2007/004758 A1 | 1/2007 | |
| WO | WO 2007/101906 A1 | 3/2007 | |
| WO | WO 2007/095492 A2 | 8/2007 | |
| WO | WO 2008/034939 A1 | 3/2008 | |
| WO | WO 2008/046010 A2 | 4/2008 | |
| WO | WO 2008/054473 A2 | 5/2008 | |
| WO | WO 2010/102759 A1 | 9/2010 | |
| WO | WO 2010/126767 A2 | 11/2010 | |

OTHER PUBLICATIONS

Office communication dated Jan. 26, 2016 for Application No. JP 2014-503905.
International Search Report and Written Opinion dated Dec. 10, 2008 in connection with Application No. PCT/US2007/078230.
International Preliminary Report on Patentability dated Mar. 17, 2009 in connection with Application No. PCT/US2007/078230.
Partial European Search Report dated Oct. 5, 2016 in connection with Application No. EP 10770141.9.
Extended European Search Report dated Apr. 5, 2017 for Application No. EP 10770141.9.
International Search Report and Written Opinion dated Nov. 19, 2010 in connection with Application No. PCT/US2010/031995.
International Preliminary Report on Patentability dated Nov. 10, 2011 in connection with Application No. PCT/US2010/031995.
International Search Report and Written Opinion dated Jun. 3, 2005 in connection with Application No. PCT/US2005/005575.
International Preliminary Report on Patentability dated Apr. 13, 2006 in connection with Application No. PCT/US2005/005575.
International Search Report and Written Opinion dated Apr. 5, 2007 in connection with Application No. PCT/US2006/036723.
International Preliminary Report on Patentability dated Mar. 26, 2008 in connection with Application No. PCT/US2006/036723.
International Search Report and Written Opinion dated Sep. 26, 2008 in connection with Application No. PCT/US2007/081770.
International Preliminary Report on Patentability dated Apr. 22, 2009 in connection with Application No. PCT/US2007/081770.
Chinese Office Action for Chinese Application No. 201480063051.7 dated Jul. 4, 2017.
Extended European Search Report dated May 26, 2017 for Application No. EP 14864890.0.
International Search Report and Written Opinion dated Mar. 10, 2015 in connection with Application No. PCT/US14/66714.
International Preliminary Report on Patentability dated Jun. 2, 2016 in connection with Application No. PCT/US14/66714.
Extended European Search Report dated Jun. 26, 2014 in connection with Application No. EP 11847983.1.
International Search Report and Written Opinion dated Aug. 28, 2012 in connection with Application No. PCT/US2011/065569.
International Preliminary Report on Patentability dated Jun. 27, 2013 in connection with Application No. PCT/US2011/065569.
Extended European Search Report dated Aug. 6, 2014 in connection with Application No. EP 12767499.2.
International Search Report and Written Opinion dated Oct. 19, 2012 in connection with Application No. PCT/US2012/031950.
International Preliminary Report on Patentability dated Oct. 17, 2013 in connection with Application No. PCT/US2012/031950.
[No Author Listed], New ink-jet technology for the formation of ultra fine dots less than 1/1000 the size of currently achieved. National Institute of Advanced Industrial Science and Technology (AIST). Press Release. Apr. 1, 2002. http://www.aist.go.jp/alst_e/new_research/20020401/20020401.html [last accessed Aug. 23, 2005]. 3 pages.
[No Author Listed], Product Information Sheet for Triton X-100. CAS No. 9002-93-1. Sigma-Aldrich. 2 pages.
Aricó et al., DMFCs: From Fundamental Aspects to Technology Development. Fuel Cells. 2001;1(2):133-61.
Barazzouk et al., Single-Wall Carbon Nanotube Films for Photocurrent Generation. A Prompt Response to Visible-Light Irradiation. J Phys Chem B. 2004;108:17015-8.
Bethune et al., Cobalt-catalysed growth of carbon nanotubes with single-atomic-layer walls. Lett Nature. 1993;363:605-7.
Beverskog et al., Revised Pourbaix diagrams for nickel at 25-300° C. Corros Sci. May 1997;39(5):969-80.
Bidault et al., Review of gas diffusion cathodes for alkaline fuel cells. J Power Sources. 2009;187:39-48.
Bradley et al., Short-channel effects in contact-passivated nanotube chemical sensors. Appl Phys Lett. 2003;83(18):3821-3.
Butt, Carbon-NanoTube Transistors. Purdue University, School of Electrical and Computer Engineering. 6 pages.
Chen et al., Chemically doped double walled carbon nanotubes. Cylindrical Molecular Capacitors. Jun. 27, 2003;90(25):257403.1-4.
Choi et al., Pyrene-containing polystyrene segmented copolymer from nitroxide mediated polymerization and its application for the noncovalent functionalization of as-prepared multiwalled carbon nanotubes. Eur Polym J. Jul. 11, 2008;44:3087-95.
Du et al., Effect of nanotube alignment on percolation conductivity in carbon nanotube/polymer composites. Phys Rev B. 2005;72:12140.1-4.
Du et al., Preparation and preliminary property study of carbon nanotubes films by electrophoretic deposition. Mater Lett. 2002;57:434-8.
Fan et al., Self-Oriented Regular Arrays of Carbon Nanotubes and their Field Emission Properties. Science. Jan. 22, 1999;283:512-4.
Feng et al., Water Soluble Multi-Walled Nanotube and its Film Characteristics. Chin Phys Lett. 2003;20(5):753-5.
Ferrer-Anglada et al., Conducting transparent thin films based on Carbon Nanotubes—Conducting Polymers. Electronics Properties of Synthetic Nanostructures. Ed. Kuzmany et al. CP723. 2004;591-4.
Ferrer-Anglada et al., Synthesis and characterization of carbon nanotube-conducting polymer thin films. Diamond Rel Mater. 2004;13:256-60.
Fischer, Magnetically aligned single wall carbon nanotube films:Preferred orientation and anisotropic transport properties. J Appl Phys. Feb. 15, 2003;93(4):2157-63.
Girishkumar et al., Single-wall carbon nanotube-based proton exchange membrane assembly for hydrogen fuel cells. Langmuir. 2005;21(18):8487-94.

(56) References Cited

OTHER PUBLICATIONS

Godbole et al., Deposition and characterization of silver nano-films by a novel solid liquid interface reaction technique (SLIRT). Mater Lett. 2005;59:1958-61.

Gong et al., Nitrogen-Doped Carbon Nanotube Arrays with High Electrocatalytic Activity for Oxygen Reduction. Sci. Feb. 6, 2009;323:760-4.

Guo et al., Multi-layer LB films of single-wall carbon nanotubes. Physica B. 2002;323:235-6.

Huang et al., Growth of aligned SWNT arrays from water-soluble molecular cluster for nanotube device fabrication. Phys Chem Chem Phys. 2004;6:1077-9.

Huang et al., Self-organizing high-density single-walled carbon nanotube arrays from surfactant suspensions. Nanotech. 2004;15:1450-4.

Jacquemin et al., Doping mechanism in single-wall carbon nanotubes studied by optical absorption. Synth Metal. 2000;115:283-7.

Kaempgen et al., Transparent CNT Composites, Molecular Nanostructures. XVII International Winterschool/Euroconference on Electronic Properties of Novel Materials. 2003;554-8.

Kataura et al., Optical Properties of Single-Wall Carbon Nanotubes. Synth Metal. 1999;103:2555-8.

Kavan et al., Electrochemical Tuning of Electronic Structure of Single-Walled Carbon Nanotubes: In-situ Raman and Vis-NIR Study. J Phys Chem. 2001;105:10764-71.

Kazaoui et al., Electrochemical tuning of electronic states in single-wall carbon nanotubes studies by in situ absorption spectroscopy and ac resistance. Appl Phys Lett. May 28, 2001;78(22):3433-5.

Kim et al., Homogenous and structurally controlled thin films of single-wall carbon nanotubes by the Langmuir-Blodgett technique. Synth Metal. 2003;(135-6):747-8.

Kim et al., Langmuir-Blodgett films of single-of carbon nanotubes: layer-by-layer deposition and in-place orientation of tubes. Jap J Appl Phys. 2003;43(12):7629-34.

Kinoshita, Carbon: Electrochemical and physicochemical properties. John Wiley & Sons. 1988;372-3.

Kongkanand et al., Single-Wall Carbon Nanotubes Supported Platinum Nanoparticles with Improved Electrocatalytic Activity for Oxygen Reduction Reaction. Langmuir. 2006;22(5):2392-6.

Le Goff et al., From hydrogenases to noble metal-free catalytic nanomaterials for H2 production and uptake. Science. Dec. 4, 2009;326(5958):1384-7. doi: 10.1126/science.1179773.

Lee et al., Single Wall Carbon Nanotubes for p-Type Ohmic Contacts to GaN Light-Emitting Diodes. Nano Lett. 2004;4(5):911-4.

Li et al., Carbon nanotube film by filtration as cathode catalyst support for proton-exchange membrane fuel cell. Langmuir. Oct. 11, 2005;21(21):9386-9.

Lijima, Helical microtubules of graphitic carbon. Lett Nature. 1991;354:56-8.

Liu et al., Electrochemical Characterization of Films of Single-Walled Carbon Nanotubes and Their Possible Application in Supercapacitors. Electrochem Solid-State Lett. 1999;11:577-8.

Liu et al., Stable non-covalent functionalization of multi-walled carbon nanotubes by pyrene-polyethylene glycol through [pi]—[pi] stacking. New Journal of Chem. 2009;33:1017-24.

Meitl et al., Solution Casting and Transfer Printing Single-Walled Carbon Nanotube Films. Nano Lett. 2004;4(9):1643-7.

Merki et al., Amorphous molybdenum sulfide films as catalysts for electrochemical hydrogen production in water. Chem Sci. 2011;2:1262-7.

Mickelson et al., Fluorination of single-wall carbon nanotubes. Chem Phys Lett. 1998;296:188-94.

Minami, Optical properties of semiconducting and metallic single wall carbon nanotubes: effects of doping and high pressure. Synth Metal. 2001;116:405-9.

Miranda et al., Design of a chemical sensor based on a Carbon Nanotube functionalized with DNA. PASEO 2009. Buenos Aires, Argentina. Mar. 7, 2009 pages.

Misra et al., Hydrogen evolution on hydrophobic aligned carbon nanotube arrays. ACS Nano. Dec. 22, 2009;3(12):3903-8. doi: 10.1021/nn900878d.

Muzibur et al., Studies of Electrochemical Behaviour of SWNT-Film Electrodes. J. Braz. Chem. Soc. 2007. 18;1150-7.

Nguyen et al., Synthesis of multi-walled carbon nanotubes for NH3 gas detection. Physica E. 2007;37:54-7.

Nikolaev et al., Gas-phase catalytic growth of single-walled carbon nanotubes from carbon monoxide. Chem Phys Lett. 1999;313:91-7.

Nilsson et al., Scanning field emission from patterned carbon nanotube films. Appl Phys Lett. Apr. 10, 2000;76(15):2071-3.

Nose et al., Electrochemical oxidation of highly oriented pyrolytic graphite in sulphuric acid solution under potential pulse condition. Fuel Cells. Jun. 2009;9(3):284-90.

Novak et al., Macroelectronic application of carbon nanotube networks. Solid-State Electron. 2004;48:1753-6.

Oh et al., Organic molecules as mediators and catalysts for photocatalytic and electrocatalytic $CO_2$ reduction. Chem Soc Rev. 2013;42(6):2253-61.

Papakonstantinou et al., Fundamental electrochemical properties of carbon nanotube electrodes. Fullerenes Nanotubes Carb Nanostruct. 2005 Dep;13:91-108.

Pawlowski et al., Novel photoacid generators. Key components for the progress of chemically amplified photoresist systems. J Photopolymer Sci Tech. 1991;4(3):389-402.

Peltola et al., Carbon-Nanotube Transparent Electrodes for Flexible Displays. Info Displays. Feb. 2007;2-5.

Peng et al., Carbon Nanotube Chemical and Mechanical Sensors. Conference Paper for the 3rd International Workshop on Structural Health Monitoring. Stanford, CA. Sep. 12-14, 2001. 8 pages.

Petrov et al., Noncovalent functionalization of multi-walled carbon nanotubes by pyrene containing polymers. Chem Commun (Camb). Dec. 7, 2003;(23):2904-5.

Powell et al., A laboratory exercise introducing students to the Pourbaix diagram for cobalt. J Chem Educ. 1987;64(2):165-7.

Prosini et al., Electrochemical studies of hydrogen evolution, storage and oxidation on carbon nanotube electrodes. J Power Sources. 2003;118(1):265-9.

Rai et al., Dispersions of Functionalized Single-Walled Carbon Nanotubes in Strong Acids: Solubility and Rheology. J Nanosci Nanotech. 2007;7:3378-85.

Raudino et al., Modeling of low-temperature depolymerization of poly(methyl methacrylate) promoted by ion beam. J Chem Phys. Jul. 22, 1999;111(4):1721-31.

Rinzler et al., Large-scale purification of single-wall carbon nanotubes: process, product, and characterization. Appl Phys A. 1998;67:29-37.

Robinson et al., Improved chemical detection using single-walled carbon nanotube network capicitors. Sensors Actuators A. 2007;135:309-14.

Ryan et al., Novel sub-ceiling temperature rapid depolymerization-repolymerization reactions of cyanoacrylate polymers. Macromolec Rapid Comm. 1996;17:217-27.

Sakakibara et al., Near-infrared saturable absorption of single-wall carbon nanotubes prepared by laser ablation method. Jap J Appl Phys. 2003;42(5A):L494-6. Abstract.

Salzmann et al., Highly hydrophilic and stable polypeptide/single-wall carbon nanotube conjugates. J Mater Chem. 2008;18:1977-83.

Shao et al., Comparative Investigation of the Resistance to Electrochemical Oxidation of Carbon Black and Carbon Nanotubes in Aqueous Sulfuric Acid Solution. Electrochimica Acta. 2006. 51. 5853-7.

Sreekumar et al., Single-Wall Carbon Nanotube Films. Chem Mater. 2003;15:175-8.

Urbonaite, Synthesis and characterisation of carbide derived carbons. Doctoral Thesis, Department of Physical, Inorganic and Structural Chemistry, Stockholm University. 2008:1-82.

Van De Witte et al., Phase separation processes in polymer solutions in relation to membrane formation. J Membrane Sci. Jan. 1, 1996;117:1-31.

Villalpando-Paez et al., Synthesis and characterization of long strands of nitrogen-doped single-walled carbon nanotubes. Chem Phys Lett. 2006;424:345-52.

(56) References Cited

OTHER PUBLICATIONS

Wagner et al., Change of electrochemical impedance spectra (EIS) with time during CO-poisoning of the Pt-anode in a membrane fuel cell. J Power Sources. 2004;127:341-7.
Wang et al., Light Scattering Study on SWNTs Solutions. American Physical Society. Annual APS March Meeting 2003. Mar. 3-7, 2003. Meeting Session C1, Poster Session I. Abstract No. C1.014. 1 page.
Ward et al., A nonvolatile nanoelectromechanical memory element utilizing a fabric of carbon nanotubes. Non-Volatile Memory Technology Symposium. 2004;34-8. Abstract.
Winther-Jensen et al., Conducting polymer composite materials for hydrogen generation. Adv Mater. Apr. 18, 2010;22(15):1727-30. doi: 10.1002/adma.200902934.
Wu et al., Green Power Source Material. Chemical Industry Publishing House. 2008: 268.
Wu et al., Transparent Conductive Carbon Nanotube Films. Science. Aug. 27, 2004;305:1273-6.
Xue et al., The preparation of highly water-soluble multi-walled carbon nanotubes by irreversible noncovalent functionalization with a pyrene-carrying polymer. Nanotech. May 28, 2008;19(21):215604. doi: 10.1088/0957-4484/19/21/215604. Epub Apr. 21, 2008. 7 pages.
Yamada et al., Toward Environmentally Friendly Photolithographic Materials: A New Class of Water-Soluble Photoresists. Macromolec. 2004;37(2):377-84.
Yang et al., Functionalization of multiwalled carbon nanotubes by pyrene-labeled hydroxypropyl cellulose. J Phys Chem B. Oct. 16, 2008;112(41):12934-9. doi: 10.1021/jp805424f. Epub Sep. 23, 2008.
Yang et al., Hydrogen generation using PPy-FMS modified PVDF membrane and other substrates. Synth Metals. 2005;154:69-72.
Yang et al., Preparation and characterization of water-soluble single-walled carbon nanotubes by hybridization with hydroxypropyl cellulose derivatives. Ind Eng Chem Res. 2010;49(6):2747-51.
Yuan et al., Electronic interactions and polymer effect in the functionalization and solvation of carbon nanotubes by pyrene-and ferrocene-containg poly(1-alkynes)s. Macromol. Feb. 2008;41(3):701-7.
Yuan et al., Property Control of Single Walled Carbon Nanotubes and Their Devices. Dissertation. Department of Chemistry, Duke University. Dec. 2008 167 pages.
Zhang et al., Microwave-assisted synthesis of Pt/CNT nanocomposite electrocatalysts for PEM fuel cells. Nanoscale. Feb. 2010;2(2):282-6. doi: 10.1039/b9nr00140a. Epub Oct. 12, 2009.
U.S. Appl. No. 13/265,976, filed Dec. 29, 2011, Rinzler et al.
U.S. Appl. No. 15/038,126, filed May 20, 2016, Rinzler et al.
PCT/US2007/078230, Dec. 10, 2008, International Search Report and Written Opinion.
PCT/US2007/078230, Mar. 17, 2009, International Preliminary Report on Patentability.
EP 10770141.9, Oct. 5, 2016, Partial European Search Report.
EP 10770141.9, Apr. 5, 2017, Extended European Search Report.
PCT/US2010/031995, Nov. 19, 2010, International Search Report and Written Opinion.
PCT/US2010/031995, Nov. 10, 2011, International Preliminary Report on Patentability.
PCT/US2005/005575, Jun. 3, 2005, International Search Report and Written Opinion.
PCT/US2005/005575, Apr. 13, 2006, International Preliminary Report on Patentability.
PCT/US2006/036723, Apr. 5, 2007, International Search Report and Written Opinion.
PCT/US2006/036723, Mar. 26, 2008, International Preliminary Report on Patentability.
PCT/US2007/081770, Sep. 26, 2008, International Search Report and Written Opinion.
PCT/US2007/081770, Apr. 22, 2009, International Preliminary Report on Patentability.
CN 201480063051.7, Jul. 4, 2017, Office Action.
EP 14864890.0, May 26, 2017, Extended European Search Report.
PCT/US14/66714, Mar. 10, 2015, International Search Report and Written Opinion.
PCT/US14/66714, Jun. 2, 2016, International Preliminary Report on Patentability.
EP 11847983.1, Jun. 26, 2014, Extended European Search Report.
PCT/US2011/065569, Aug. 28, 2012, International Search Report and Written Opinion.
PCT/US2011/065569, Jun. 27, 2013, International Preliminary Report on Patentability.
EP 12767499.2, Aug. 6, 2014, Extended European Search Report.
PCT/US2012/031950, Oct. 19, 2012, International Search Report and Written Opinion.
PCT/US2012/031950, Oct. 17, 2013, International Preliminary Report on Patentability.

\* cited by examiner

HYDROGEN OXIDATION AND GENERATION OVER CARBON FILMS

RELATED APPLICATIONS

The present application is a continuation of U.S. application Ser. No. 15/173,581, filed Jun. 3, 2016, which is a divisional of U.S. application Ser. No. 13/994,906, filed Jun. 17, 2013, which is a national stage filing under 35 U.S.C. § 371 of International Application No. PCT/US2011/065569, filed Dec. 16, 2011, which claims priority under 35 U.S.C. § 119(e) to U.S. Provisional Application Ser. No. 61/424,323, filed Dec. 17, 2010, each of which is hereby incorporated by reference herein in its entirety, including any figures, tables, or drawings.

BACKGROUND OF INVENTION

Restraining the widespread use of solar cells and windmills for power generation is the problem that energy demand does not vary in the manner of the availability of sunlight and wind. Therefore, an efficient means of storing and releasing energy during periods of excess and insufficient generation by these sources is needed for the promotion of these natural renewable energy sources. Coupling an unreliable primary generator to a regenerative fuel cell can perform that function. The regenerative fuel cell operates by storing energy by the generation of hydrogen via the electrolysis of water and releasing energy upon demand by oxidation of the hydrogen, generally regenerating water. By using one or more fuel cells matched in capacity to the primary power generator, a reliable system can result. Fuel cells are attractive because they can be compact and can possess a low internal resistance.

Present cells, capable of performing this function, generally rely on the use of platinum as an electrocatalyst. Unfortunately, platinum is of insufficient supply to make this a viable option for large scale application of the technology. State of art electrodes use precious metal catalysts for the generation and oxidation of hydrogen since non-noble metal electrocatalysts exhibit corrosion in acidic or other environments under which these reactions are carried out. Additionally, noble metals electrodes often exhibit performance degradation with time due to the loss of electrochemical surface area because the finely divided particles agglomerate.

An article entitled: "From Hydrogenases to Noble Metal-Free catalytic nanomaterials for $H_2$ Production and Uptake", Le Goff et al. *Science,* 326, 1384 (2009), reports that hydrogen ($H_2$) generation results from water electrolysis and hydrogen oxidation over a nickel complex based electrocatalyst supported on multiwall carbon nanotubes (MWNTs). Control experiments, reported therein, indicate that MWNTs do not function as an effective electrocatalyst for either hydrogen generation or oxidation, and catalytic currents observed for the subject electrocatalyst during $H_2$ oxidation and generation can be attributed solely to the Nickel complex supported by the MWNTs.

Other alternates to Pt have been examined as electrocatalysts for the formation of $H_2$. Yang et al., *Synthetic Metals* 154, 69 (2005) entitled: "Hydrogen Generation using PPy-FMS modified PVDF Membrane and Other Substrates," reports the polypyrrole containing catalytic ferrocene centers can increase electrocatalyst's conversion current compared to Pt. Unfortunately, it was concluded that a Pt supporting electrode is required for observation of long-term stability as deposition of the polypyrrole on stainless steel results in catalytic properties vanishing after just a few hours. The reverse reaction, $H_2$ oxidation, is not disclosed in Yang et al.

Winther-Jensen et al., *Adv. Mater.* 22, 1727 (2010) entitled: "Conducting Polymer Composite Materials for Hydrogen Generation," reports hydrogen generation from aqueous acidic electrolyte solution using a conducting polymer composite, comprising poly(3,4-ethylenedioxythiophene) (PEDOT) polymerized on a polytetrafluoroethylene (PTFE) membrane in the presence of polyethylene glycol (PEG), as the electrocatalyst. Catalytic activity of the PEDOT-PEG composite improved after 24 hour immersion in 1M sulfuric acid with the increased activity attributed to the swelling of the composite by that electrolyte solution. The overpotential observed for the composite electrode was higher than that observed with Pt. The reverse reaction, $H_2$ oxidation, is not reported in Winther-Jensen et al.

Carbon has been extensively studied as a catalyst support in the hydrogen evolution reaction (HER) and the hydrogen oxidation reaction (HOR). Although carbon appears to synergistically enhance the activity of the metallic catalysts for HER and HOR, carbon electrodes that are free of metallic catalysts are reported to promote HER only at a high overpotential but are not reported to promote HOR. Prosini et al., *J. Power Sources* 118, 265-269 (2003) disclose that carbon nanotube films produce hydrogen but required a significant overpotential for hydrogen oxidation. Misra et al., *ACS Nano* 3, 3903-3908 (2009) disclose that MWNTs displayed hydrogen evolution at a voltage of −10 V and is silent on HOR.

As stated in Kinoshita, K., *Carbon: Electrochemical and Physicochemical Properties* (Wiley, New York, 1988): "The hydrogen overpotential on most graphite and carbon surfaces is high; consequently these materials, by themselves, are not useful electrodes for hydrogen oxidation/evolution"; and " . . . carbon does not have electrochemical activity for the electrochemical oxidation of $H_2$." To this end, an electrode comprising an effective non-noble metal, stable electrocatalyst that exhibits little or no overpotential during the generation or oxidation of $H_2$ remains a goal.

BRIEF SUMMARY

Embodiments of the invention are directed to an electrode for an electrochemical cell that comprises a carbon-comprising film or body, for example, single walled carbon nanotube (SWNT) or graphite, where a portion of the carbon comprising film or body consists of at least 99% $sp^2$ carbons that has undergone an activation process consisting of exposure to oxidizing acids along with some cathodic electrochemical cycling. In an embodiment of the invention, a thin carbon-comprising film can be combined with a porous support, such as a porous polytetrafluoroethylene (PTFE), polyvinylidene fluoride (PVDF), polyethylene, polypropylene, polyester, polyamide, carbon paper, or other porous membranes. The carbon-comprising film can be as thin as about 20 nm up to a thickness of 100 μm.

Embodiments of the invention are directed to electrochemical devices comprising at least one electrode comprising an activated carbon-comprising film or body. The electrochemical device can perform a hydrogen evolution reaction (HER) in an electrolyzer mode and can perform a hydrogen oxidation reaction (HOR) in a fuel cell mode. In another embodiment of the invention, the electrochemical device can be a component of a sustainable electrical energy storage/generation system. The system employs a primary energy generator driven by a natural renewable energy source, which does not combust a fuel, where the primary energy source is coupled to a secondary energy generator that is the electrochemical device according to an embodiment of the invention. The secondary energy source functions as an electrolyser to store energy from this primary source as hydrogen, when the primary electrical energy generator generates energy in excess of the demand upon the system, and functions as a fuel cell to consume the hydrogen with the generation of electricity, when the conditions do not permit the primary system to generate sufficient energy for the demand upon the system. Primary energy generators can be solar cells, wind turbines, or water turbines.

DETAILED DISCLOSURE

Figure 1A:
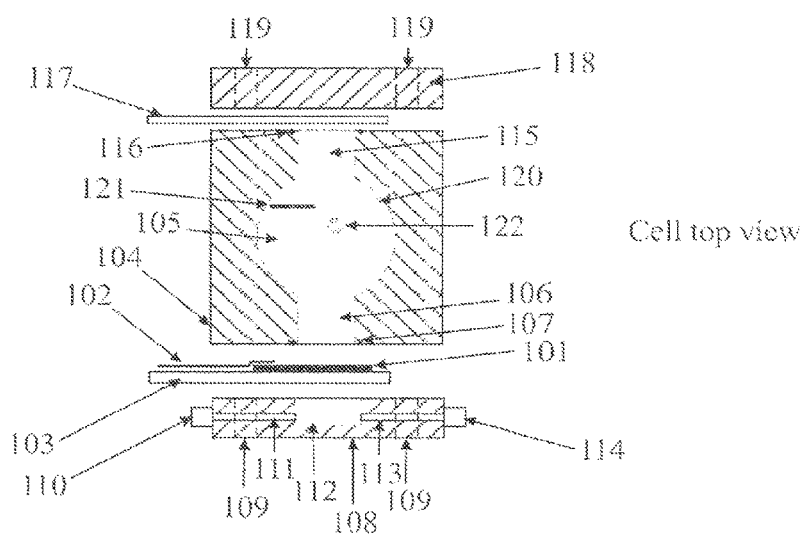
FIG. 1A shows a top view of an exemplary electrochemical cell, according to an embodiment of the invention, used to examine the hydrogen oxidation reaction (HOR) and hydrogen evolution reaction (HER).

It has been discovered that by exposing carbon materials, where at least portions thereof consists of more than 99% sp$^2$ hybridized carbons, to acids that are intercalants of graphite while undergoing low voltage cathodic cycling, form carbon materials that are highly active as HER and HOR electrodes that initiate at near zero overpotentials. These electrodes comprising acid treated carbon materials display activities that can exceed the activity of the best known non-precious metal catalysts for HER and HOR. The high activity for HER persists in pH neutral water and in sea water. Although most of the disclosure herein is directed to exemplary embodiments employing single wall carbon nanotubes (SWNTs), in embodiments of the invention, other carbon materials consisting of more than 99% $sp^2$ bonded carbons, such as highly ordered pyrolytic graphite and sintered microcrystalline graphite can be included in the effective catalysts towards HER and HOR, which display high activity and nearly zero overpotential. Although exemplary embodiments are directed toward films, the electrodes need not be a film, but can be a body of any shape which may be configured to possess a high degree of open porosity making a large surface area accessible by electrolytes. A nearly zero overpotential is one where the onset overpotential is less than about 10 mV in a strong acid (pH 1 or less) and about 70 mV in a pH neutral (pH 7) electrolyte. In contrast, catalytic activity has not been observed for acid treated glassy carbons, where the overpotential for observation of HER remains over 500 mV in strong aqueous acids.

Embodiments of the invention are directed to electrodes having an electrocatalyst for hydrogen ($H_2$) generation and oxidation that comprises a carbon-comprising film, for example, a single walled carbon nanotube (SWNT) film, where the overpotential for generation of $H_2$ is nearly zero. During studies on uses of SWNTs, it was discovered that SWNT film electrodes can have a high oxygen reduction activity; similar to platinum (Pt), but no catalytic activity was observed for SWNT films toward HOR. However, studies of oxygen reduction in sulfuric acid using SWNTs indicated that proton reduction currents accompanying hydrogen evolution increased over time. Further study revealed that after exposure of SWNT films to an acid electrolyte with a few low voltage cathodic cycles, the $H_2$ evolution reaction (HER) initiates at zero overpotential. The overpotential is the difference between the observed applied potential required for a reaction to occur and the thermodynamic potential for the reaction. Exposure of $H_2$ to the electrode comprising acid treated SWNT films, according to an embodiment of the invention, results in a facile hydrogen oxidation reaction (HOR) that exceeds the efficiency disclosed for the Ni complex supported on MWNT, which is disclosed in Le Goff et al. The HER activity of electrodes comprising acid exposed SWNT films also exceeds that of commercially available Pt-loaded electrodes on a mass basis.

An electrode, according to an embodiment of the invention, is fabricated employing the deposition of a SWNT thin film in the manner disclosed in U.S. Pat. No. 7,261,852, which is incorporated in its entirety herein. By this method, a suspension of SWNTs in water using a surfactant is vacuum filtered onto the surface of a filtration membrane having pores that are too small for penetration of the SWNTs into the pores. After removal of the aqueous portion of the suspension, SWNT bound surfactant is washed from the film and the film is dried. The film can vary, as required, in surface area and thickness. The film porosity can be increased by a number of means, including those disclosed in U.S. Pat. No. 7,704,479, incorporated in its entirety herein. The geometric surface area is determined by the size of the surface of the filtration membrane to which the suspension is provided and through which the aqueous solution is passed. Any portion of a filtration membrane can be use, and, in some embodiments of the invention, less than 100 percent of the membrane surface is used. In an embodiment of the invention, a HOR electrode is formed such that hydrogen accesses the acid treated SWNT film through the pores of the filtration membrane, which is tolerant of an acidic electrolyte. The membrane can be hydrophobic. The film comprises a plurality of SWNTs that are oriented with their long axis approximately parallel to the adjacent surface of the membrane, with the nanotubes randomly oriented within the local plane of the film, such that there is intimate electrical contact, generally with intimate physical contact, between nanotubes over the entire surface of the film. In this manner, the electrical conductivity over the entire film can be high for a very thin film, for example having a thickness of about 20 nm to about 200 nm in thickness. Thick SWNT films, for example, up to 1 to 100 μm or more, can be used, and bodies having dimensions in excess of 100 μm can be used.

In embodiments of the invention, acid treatment for activation of the SWNT comprises contacting the SWNT film with an acid solution for a sufficient period of time with a number of cathodic cycles induced over the course of the exposure. The number of cycles necessary to induce the activity being less than 100. The solution can be an aqueous solution or a non-aqueous solution. The time required for activation depends on the concentration and strength of the acid. An exemplary activated film has been treated with an aqueous 1M sulfuric acid solution for 120 hours. Other strong acids can be used at higher and lower concentrations, as can be appreciated by one skilled in the art. Other Brønsted acids can be used, for example, nitric acid, perchloric acid, trifluoroacetic acid, trifluoromethanesulfonic acid, perfluorobutanesulfonic acid, boric acid, iodic acid, and periodic acid. In other embodiments of the invention, the acid can be a Lewis acid, for example, metal chlorides, bromides, fluorides and oxyhalides such as $AlCl_3$, $AlBr_3$, $FeCl_3$, $AsF_5$, and $SbCl_5$.

When employed as a HER electrode, a porous membrane can allow egress of the $H_2$ produced. The electrode includes an electrical contact to the carbon-comprising film. For example, a SWNT film can be deposited on a portion of a porous disk and an electrical conductor, for example, a metal, can be formed on another portion of the filtration membrane that overlaps onto the portion having the carbon-comprising film. For example, a metal can be deposited by any of various techniques, such as sputtering, evaporation or electrolytic deposition, on a specific portion of the carbon-comprising film. The hydrophobic filtration membrane can be polytetrafluoroethylene (PTFE), polyvinylidene fluoride (PVDF), polyethylene, polypropylene, polyester, polyamide, porous carbon paper, or any other membrane. In other embodiments of the invention, the porous membrane can be a polymer generally considered hydrophilic where the surface has been treated to achieve a hydrophobic surface. In other embodiments of the invention, the membrane can be a porous glass or ceramic that can be inherently resistant to wetting or can be treated to generate a hydrophobic surface. For example a sintered glass membrane can be surface treated with a silane coupling agent to render the surface hydrophobic and poorly wettable by an aqueous solution.

The HOR rate observed for an electrocatalytic acid treated SWNT film, according to an embodiment of the invention, can be optimized by maximizing the three phase interface between $H_2$, the SWNT film electrode, and the electrolyte solution. Optimization can be carried out as disclosed in International Publication No WO 2010/126767, Nov. 4, 2010, and incorporated herein by reference, for the use of pure SWNT films for oxygen reduction. According to embodiments of the invention, hydrogen diffuses through the pores of the membrane to a three phase interface, where the hydrogen gas, the solid SWNT film and the liquid electrolyte are present. At this three phase interface, hydrogen dissolves into the surface layer of electrolyte solution and is oxidized upon contact with the SWNT film electrode, providing electrons to the external circuit through the SWNT film. When the acid contacted SWNT film is used as an anode for hydrogen oxidation in combination with a SWNT oxygen reducing cathode, as disclosed in WO 2010/126767, a completely metal catalyst free hydrogen-oxygen fuel cell is constructed according to an embodiment of the invention.

According to an embodiment of the invention, an electrochemical device comprising the electrode comprising an acid treated carbon-comprising film is included to form a sustainable energy storage/generation system in conjunction with a primary renewable energy generator. Because natural renewable energy conversion by primary sources, such as solar and wind sources by a solar cell or wind turbine, are, by their nature, irregular and unpredictable, the energy from this primary source in excess of that immediately consumed, when conditions are favorable for generation, is stored as hydrogen that is produced via electrolysis of water in an electrolyser coupled to a gas storage device. Subsequently, when the primary energy source is insufficient for achievement of the energy demand, the electrolyser runs in reverse as a fuel cell to supply needed energy. In an embodiment of the invention, the primary natural energy source can be reliable, such as a hydroelectric source using a water turbine, but has extended periods where the energy generated or consumed are excessive or insufficient, respectively, for example, during the day and night in a residence. By coupling of the primary source to the electrochemical device comprising the electrode comprising an acid treated carbon-comprising film or body, hydrogen can be generated at low energy demand, such as during the night, and stored for supplementation of the primary energy source during peak demand, for example, at peak activity times during the day.

Methods and Materials

To examine the acid treated SWNT film electrodes for HER and HOR, SWNT films were deposited on oversized 47 mm diameter PTFE filtration membranes as 15 mm diameter disks off-set to one side of the supporting membrane. Electrical contact to the SWNT film was made by sputtering a 200 nm thick layer of Pd through a rectangular shadow mask to cover from the edge of the bare membrane to the nanotube film, overlapping about ~2 mm of the 15 mm diameter SWNT film.

Figure 1B:
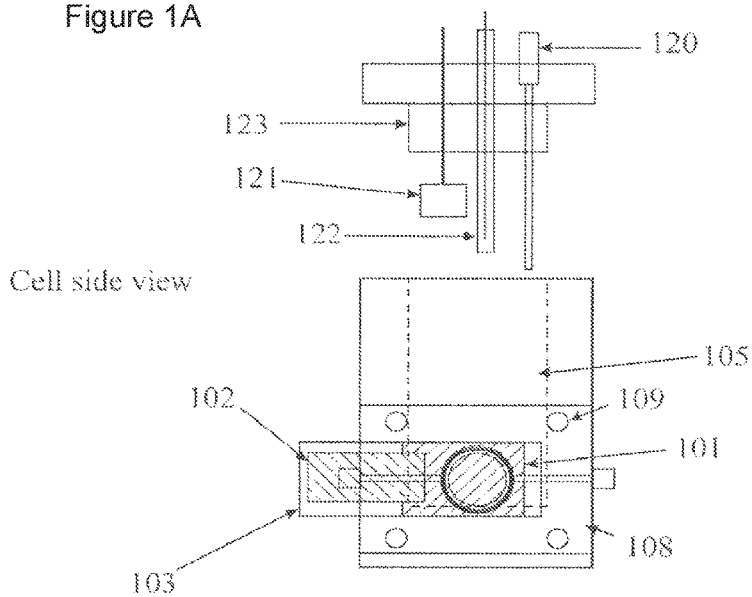
FIG. 1B shows a side view of the exemplary electrochemical cell of FIG. 1A, according to an embodiment of the invention, used to examine the hydrogen oxidation reaction (HOR) and hydrogen evolution reaction (HER).

FIGS. 1A and 1B illustrate a cross section of a metal contacted carbon-comprising film, for example, a SWNT film, on a porous membrane 102/101/103 situated in a cell used to test the electrochemical performance of the electrocatalyst in a cell for $H_2$ formation and/or oxidation, according to an embodiment of the invention. The electrode has a SWNT film 101, a contact electrode 102 and an underlying porous hydrophobic membrane 103. The cell body 104 was fabricated from a solid rectangular PTFE block (3.6 cm×3.6 cm×5.6 cm), with a 2.54 cm diameter hole bored from the top (along the long axis) to create a 4.6 cm deep electrolyte reservoir 105. A 0.76 cm diameter opening 106 through the cell sidewall accesses the reservoir 105 for electrolyte within the cell. An O-ring 107 surrounds the sidewall opening 106 in the cell and forms a leak free seal against the SWNT film 101 of the SWNT film/electrode/membrane assembly 102/101/103 when the PTFE membrane 103 supporting the SWNT film 101 and electrode 102 are pressed against the O-ring 107 by a gas flow cover 108, which is fabricated from a material such as, in this example, Plexiglass. The metallic electrode 102 is located outside the electrolyte wetted region defined by the opening 106. The SWNT film/electrode/membrane assembly 102/101/103 held by the Plexiglass gas flow cover 108 is secured to the cell body 104 by screws (not shown) through holes 109 at its 4 corners. In a working cell, the O-ring 107 can be replaced with a crimp seal, epoxy cement, adhesive or curing sealant. The gas flow cover 108 incorporates a gas plenum 112 that when secured to the cell body 104 positions the plenum in line with opening 106.

$H_2$ gas is fed to and from the plenum 112 by ports 110 and 114, respectively, which are situated on either side of the plenum 112 to which they are connected through holes 111 and 113, respectively. For experimental purposes, outlet 113 allows gas to exit into a water bubbler to prevent ambient atmosphere from entering the system. The hydrophobic PTFE membrane 103 prevents the electrolyte from flowing out of the cell, while allowing diffusion of $H_2$ to the electrolyte wetted SWNT film 101 in the HOR mode. In the HOR mode, the hydrogen is adsorbed, dissociated and oxidized to protons ($H^+$) with the transport of the electrons formed to the SWNT film 101 and to the external circuit through the metal electrode 102. In the HER mode, power is supplied to the SWNT cathode 101/102/103 by a voltage against a Pt counter electrode 121 (the anode) controlled with respect to a reference electrode 122, which are situated in a tight fitting cover 123 for three terminal measurements. At the anode 121, water is oxidized to liberate oxygen and protons that diffuse through the electrolyte. Protons are reduced to hydrogen at the SWNT cathode leading to $H_2$ gas evolution.

For three terminal measurements, a blank glass slide 117 is placed across the second sidewall hole in the cell sealing against the O-ring 116 by pressure from the blank cover 118. The blank cover 118 is secured against the cell body by 4 screws (not shown) that go through 4 holes in the blank cover (two indicated). The cell has a tight fitting cover 123 that has feed through holes for the counter and reference electrodes 121 and 122, respectively, and also a feed through hole for a purge tube 120 to bubble inert gas into the electrolyte and an outlet hole for the purge gas (not shown). In a two terminal measurement mode, a second gas flow cover identical to 108 is used over the second sidewall opening 115.

Rotating ring-disk electrode (RRDE) measurements were performed using a Pine Instruments AFCBP1 Bipotentiostat, AFMSRCE Rotator with an E6 series RRDE with a Pt ring and glassy carbon disk. Linear sweep and cyclic voltammograms, measured in the specially constructed electrochemical cell, were recorded using a Gamry Reference 600 Potentiostat. Faradaic Efficiency measurements were performed in the RRDE set-up, keeping the solution well stirred by rotating at 1600 rpm. A Denver Instrument model 220 meter was used for pH measurements.

Figure 2:
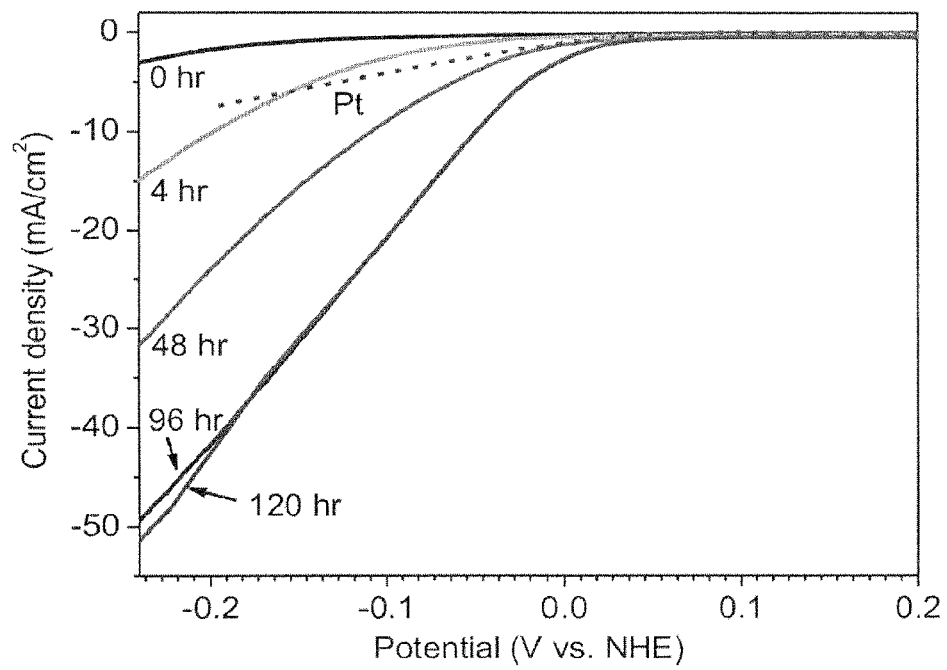
FIG. 2 is plots of current density versus potential for HER in 1M sulfuric acid for an electrode comprising a 1.5 µm thick SWNT film, according to an embodiment of the invention, scanned at 5 mV/s after 0 (top curve), 4, 48, 96, and 120 (bottom curve) hours of acid exposure and a few (<10) cathodic scan cycles from +0.2 to −0.7 V versus an NHE reference electrode, scanning at 50 mV/s between each recorded curve.
Figure 3:
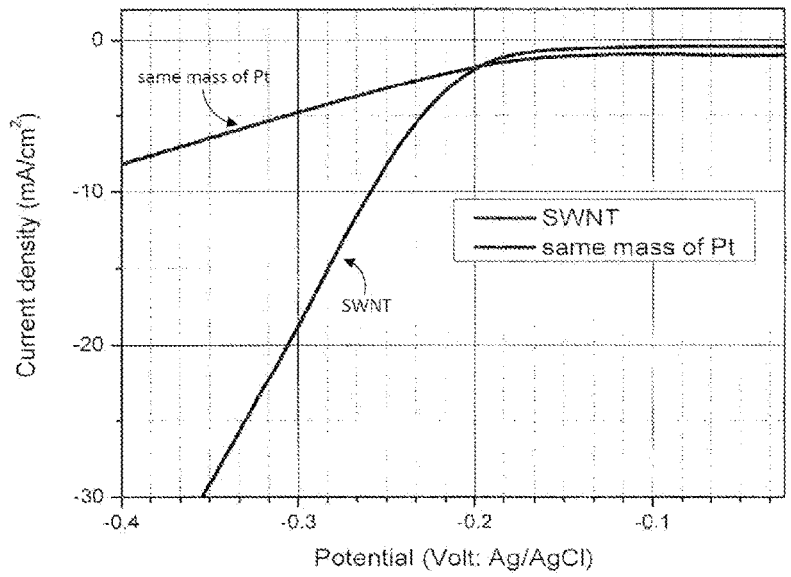
FIG. 3 displays current density versus potential plots for HER using an electrode of 0.106 mg/cm$^2$ of Pt metal sputtered onto a PTFE membrane (curve that touches the y-axis) and an electrode of 0.106 mg/cm$^2$ SWNT film on a PTFE membrane after a 120 hour treatment with 1M sulfuric acid, according to an embodiment of the invention.

HER activity of the acid treated SWNT films was studied in 1M sulfuric acid for successively increased exposure times of the SWNTs to the acid electrolyte. FIG. 2 shows plots of HER current density versus potential determined using three terminals measurements with a 1.5 µm thick SWNT film, 54 µg of SWNTs, on 0.22 µm pore Teflon membrane, scanned at 5 mV/s following 0, 4, 48, 96 and 120 hours of acid exposure using a Ag/AgCl (3M KCl) reference electrode. FIG. 2 shows potentials plotted relative to the normal hydrogen electrode (NHE) by addition of 210 mV to the Ag/AgCl (3M KCl) reference electrode value. As clearly shown in FIG. 2, the HER activity of the SWNT film increased dramatically with the acid exposure time over more than 48 hours, while the overpotential for HER gradually decreased to zero (relative to a normal hydrogen electrode (NHE)) with increasing acid exposure time. As a reference for the low onset potential of the HER, FIG. 2 plots the HER current for the cell using a 50 nm thick Pt film sputtered onto the PTFE membrane as a replacement for the SWNTs electrode. FIG. 3 shows the HER activity relative to the Ag/AgCl (3M KCl) reference electrode in 1M sulfuric acid for the 1.5 µm thick SWNT film after 120 hours of exposure to 1M sulfuric acid and for the HER activity of the 50 nm thick pure platinum film in contact with 1M sulfuric acid for 120 hours. The Pt film activity did not vary with acid exposure time. Both measurements were conducted with scanning at 5 mV/s.

Figure 4:
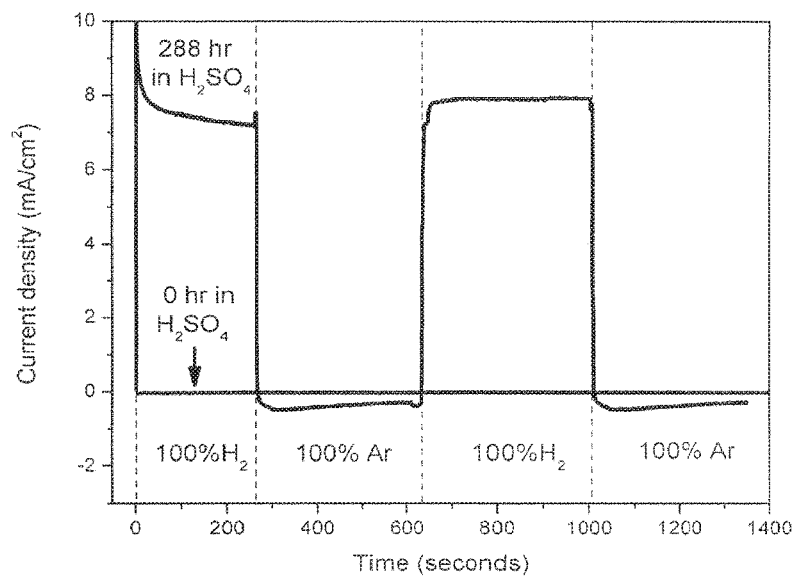
FIG. 4 is chronoamperometry plots for a three terminal measurement of a working electrode comprising a SWNT film where a high HOR activity occurs following treatment of the electrode with the 1M sulfuric acid electrolyte for 288 hours, according to an embodiment of the invention, and for the same SWNT film prior to acid treatment where the working electrodes are exposed to alternating $H_2$ and Ar atmospheres, for the films with and without acid treatment.

The necessity for acid treatment of SWNTs films for HOR electrocatalysts is shown in FIG. 4, where the SWNT film was activated by $H_2SO_4$ exposure and used in three terminal Chronoamperomtry measurements employing a 1.5 µm thick SWNT film on a PTFE membrane as the working electrode. The 1M sulfuric acid electrolyte solution was held at +0.3 V versus NHE. The gas being fed through the gas plenum 112 to the SWNT film 101 through the PTFE membrane 103, as shown in FIGS. 1A and 1B, was varied between $H_2$ and argon, as indicated in FIG. 4. Prior to activation of the SWNT film by contacting with acid, no current was observed, regardless of the gas fed to the electrode. In contrast, after the SWNT film had been exposed to the 1 M sulfuric acid, in this example for 288 hours, a rapid response with a substantial current density in the presence of $H_2$ is observed.

Figure 5:
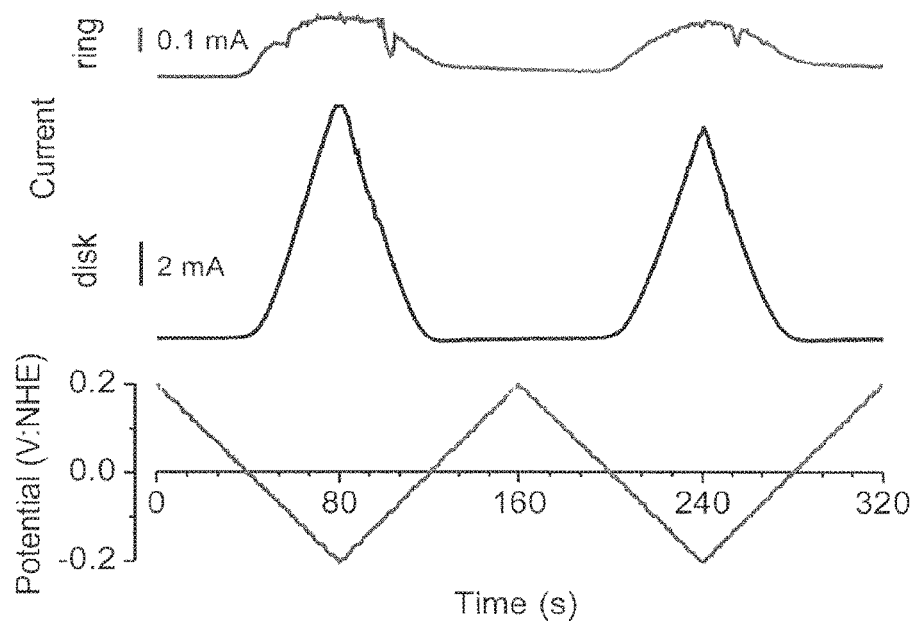
FIG. 5 shows measurements for a rotating ring-disk electrode (RRDE), according to an embodiment of the invention, confirming that the cathodic currents are due to hydrogen evolution where the ring electrode was held at +0.6 V as the activated SWNT film on the disk electrode was swept between ±0.2 V, at 5 mV/s, where the coincidence of the ring current with the disk current indicates oxidation of the hydrogen evolved at the disk.

FIG. 5 shows rotating ring-disk electrode (RRDE) data where SWNTs (27 µg) were drop cast from ethanol onto a 5 mm diameter glassy carbon disk electrode followed by activation in 1 M $H_2SO_4$ for 144 hr prior to recording the data shown. Control experiments on the glassy carbon disk electrode without nanotubes confirmed an overpotential for HER that remains high, about −500 mV vs. NHE, under similar conditioning. The measurements confirm that cathodic currents are due to proton reduction (with $H_2$ evolution). Measurements were recorded in 1 M $H_2SO_4$ with the ring rotating at 1200 rpm. The disk potential was linearly swept at 5 mV/s between ±0.2 V, as shown in the bottom plot. The center plot shows the disk reduction current, while the top curve shows the oxidation current from the Pt ring held at +0.6 V, detecting the hydrogen. With the disk held stationary, $H_2$ bubbles evolve from the nanotube layer at −60 mV, becoming increasingly vigorous with increasing overpotential. The saturation seen in the hydrogen oxidation ring current is due to the increasing number of $H_2$ bubbles that physically separate the electrolyte from the ring on their excursion outwards. The larger current dips correspond to the separation of particularly large bubbles.

Figure 6:
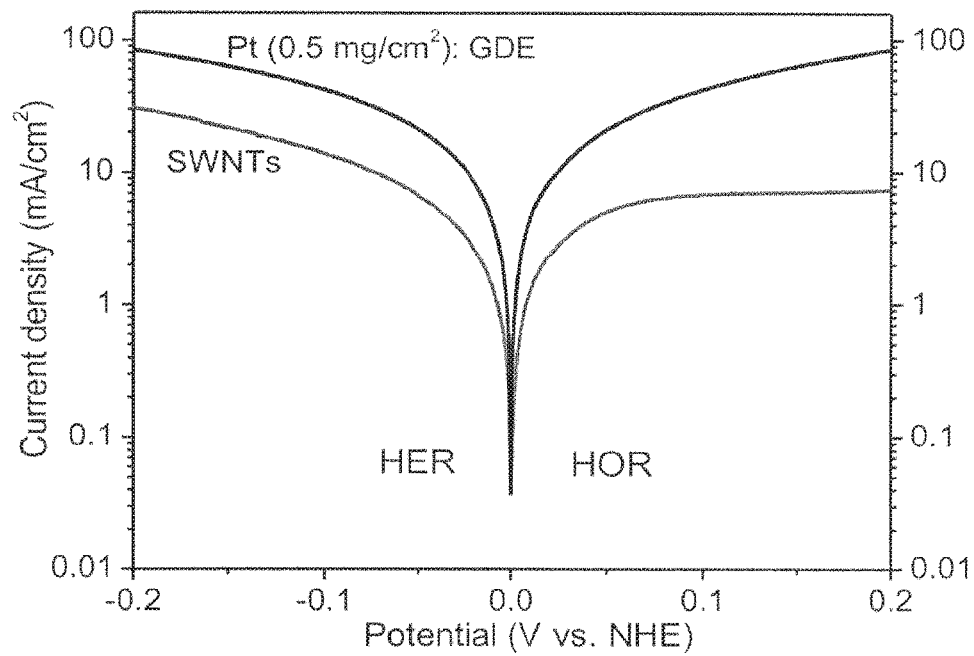
FIG. 6 is a plot of current density versus potential for HOR (positive potentials with respect to NHE) and for HER (negative potentials with respect to NHE) for the electrode comprising an acid treated SWNT film of FIG. 4, according to an embodiment of the invention, and for a commercially available Pt loaded gas diffusion electrode.

Electrocatalytic activity towards HOR and HER of a SWNT film (1.5 microns thick, 0.106 mg/cm$^2$) after 12 days exposure to 1 M $H_2SO_4$ was measured as a function of applied potential against a Pt counter electrode and referenced to a NHE electrode. In like manner, the same measurements were made using a commercially available, optimized, Pt loaded carbon electrode (BSAF ELAT GDE, 0.5 mg/cm$^2$) that, for the purpose of wetting to maximize its performance, had the potential cycled between +0.2 to −0.5 V for ~10 cycles over the course of a few minutes. The potential cycling increased the HOR and HER currents for the Pt comprising electrode by a factor of about two, which did not further increase with additional cycling or after additional time in the 1 M sulfuric acid. FIG. 6 shows the logarithmic current density as a function of overpotential in the electrochemical cell for an activated SWNT film (54 µg) measured in 1 M $H_2SO_4$ (5 mV/s scan rate) with $H_2$ flowing through the gas plenum (bottom curve). For comparison, the SWNT film was replaced with a Pt loaded (0.5 mg/cm$^2$, 250 µg Pt exposed to the electrolyte) commercial gas diffusion electrode (ELAT HT140EW, The Fuel Cell Store) and measurements were recorded under the same conditions with the platinized microporous layer facing the electrolyte (top curve). The activated SWNT electrode exhibits the transition from HER to HOR at zero overpotential, as does the Pt loaded GDE, corroborating the low overpotential for initiating the reactions on the activated SWNTs. At −200 mV overpotential, the HER current for the SWNTs is a remarkable 30 mA/cm$^2$, versus 86 mA/cm$^2$ for the Pt loaded GDE. At this overpotential the specific (mass basis) activity of the SWNTs is 278 A/g, which exceeds that 172 A/g determined for the Pt loaded electrode under these conditions. The hydrogen oxidation current at +200 mV is only slightly less remarkable for the SWNT film at 7 mA/cm$^2$, having a specific activity of 65 A/g compared to the Pt electrode's specific activity of 168 A/g under the same conditions.

Figure 7:
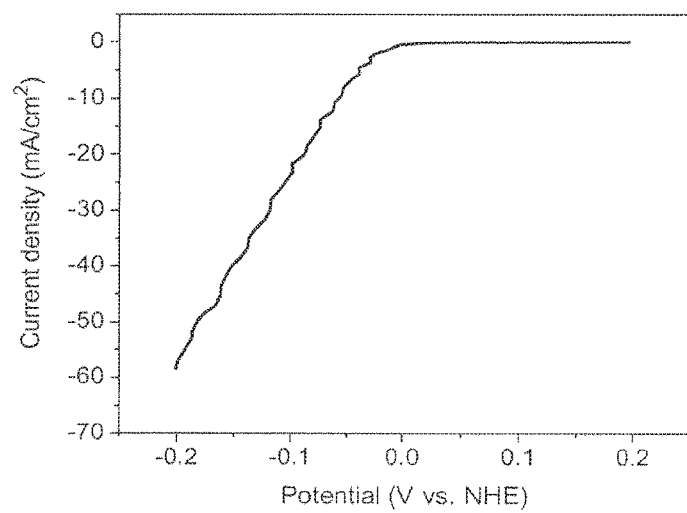
FIG. 7 is a plot of the HER current for the 27 µg activated SWNTs on the glassy carbon disk RRDE of FIG. 5, measured in a 1 M $H_2SO_4$ solution at 1400 rpm with a scan rate of 50 mV/s, which achieves a 58 mA/cm$^2$ current density at 200 mV overpotential (a specific activity of 422 A/g), according to an embodiment of the invention.

The commercial Pt electrode is highly engineered to maximize its three phase interface (catalyst-electrolyte-gas). In contrast, the acid activated SWNT film was not modified to enhance its activities. SWNTs under these conditions tend to be hydrophilic compact films that possess small-channel tortuous-path porosity. For the HOR reaction, the compactness and hydrophobicity makes relatively little of the SWNT film's thickness accessible, which, when combined with the relatively low solubility of hydrogen in acid, makes these results very impressive. Therefore, a more engineered film or support with improved porosity and hydrophobicity should produce even more impressive activities. Similarly, $H_2$ bubbles trapped on and within the film pores tend to block regions of the SWNTs film, which can be engineered for greater activity. This is consistent with the data shown in FIG. 7, using the RRDE, where the 27 µg, acid activated SWNT layer rotating at 1400 rpm attains 58 mA/cm$^2$ of HER current at −200 mV (vs. NHE), which corresponds to 422 A/g. The improvement, over the specific activity of 278 A/g for the measurement performed using the stationary electrode used in FIG. 2, results from the facile removal of the hydrogen bubbles by rotation to avoid hydrogen occluded electrode area.

Figure 8:
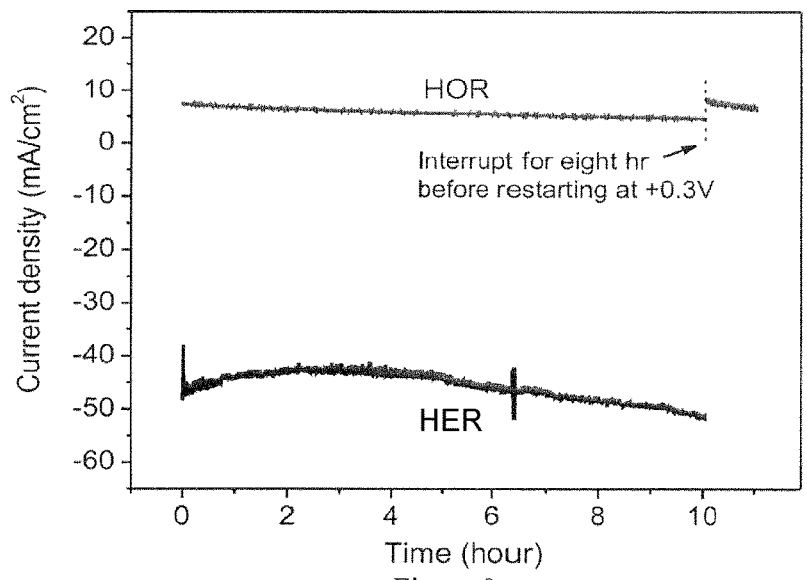
FIG. 8 is a plot of the HER and HOR currents over a 10 hour period for an activated SWNT film (54 µg) using a Teflon electrochemical cell, according to an embodiment of the invention, exposed to a 1M $H_2SO_4$ solution at +300 and −300 mV, respectively.

For comparison, at −200 mV (+200 mV), a nickel bisdiphosphine catalyst (Le Goff et al., *Science,* 2009, 326, 1384-1387) exhibits a hydrogen evolution (oxidation) current of ~1.3 mA/cm$^2$ (0.9 mA/cm$^2$) for 60 µg/cm$^2$ of the catalyst, yielding a specific activity of 22 A/g (15 A/g). Amorphous molybdenum sulfide films (Merki et al., *Chem. Sci.,* 2011, 2, 1262-1267) exhibit HER current densities disclosed be "among the highest reported for non-noble catalysts" display 14 mA/cm$^2$ at −200 mV, which is about a factor of two lower than the SWNT HER activity for the SWNT films according to an embodiment of the invention. Measurements carried over a 10 hour period, as shown in FIG. 8, demonstrate that the high activity is retained over the duration of the measurement for the SWNT HOR and HER at +300 and −300 mV, respectively. The apparent slow decay observed in FIG. 8 for the HOR activity is consistent with a confinement effect of the protons generated within the SWNT films, as indicated by interruption of the current, after which, HOR activity returns to its original value.

Figure 9:
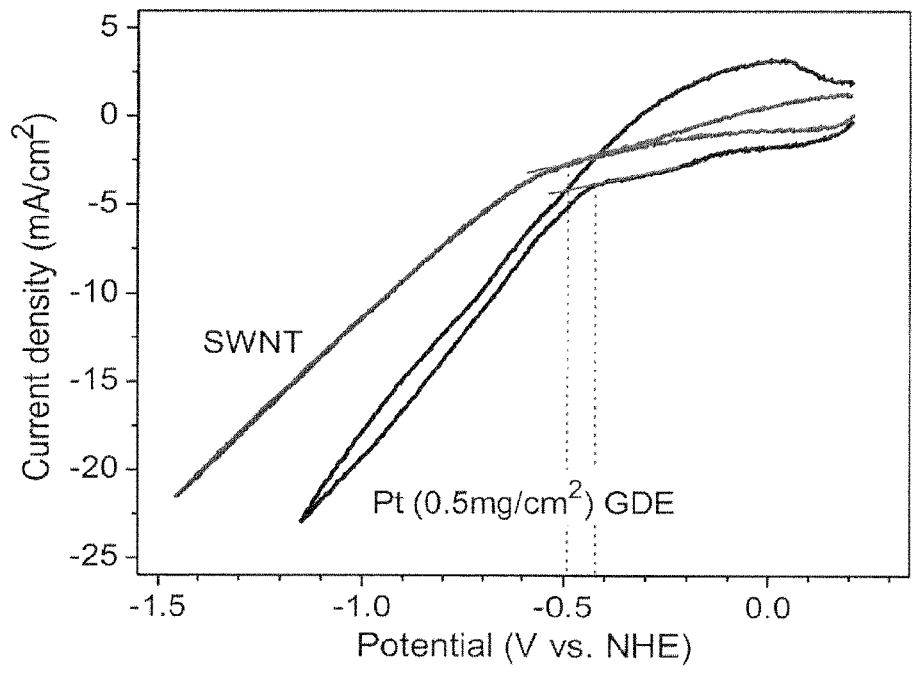
FIG. 9 shows cyclic voltammograms (CV) measured in an electrochemical cell employing an acid activated 1.5 µm thick SWNT film, according to an embodiment of the invention, in pH 7.2 phosphate buffer (0.6 M) (left curve) and with a commercial Pt loaded GDE under the same conditions.
Figure 10:
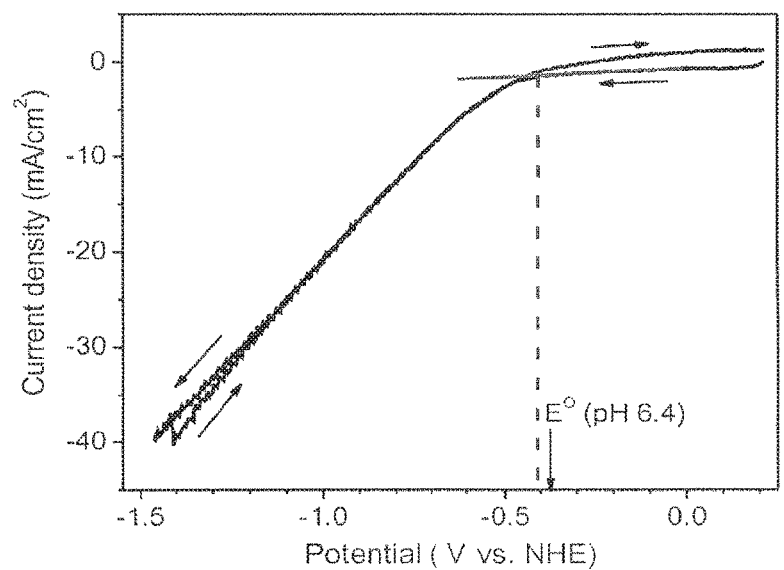
FIG. 10 shows a CV plot (50 mV/s scan rate) for a device with an electrode having an activated SWNT film (54 µg) in pH 6.4 buffer (3M) using a stirred solution where the onset of HER occurs at ~30 mV overpotential.

The films are useful for hydrogen production from pH 7 water. FIG. 9 shows HER curves for the CVs of an acid activated SWNT film (top) and the Pt loaded GDE (bottom) using a pH 7.2 phosphate buffer (0.6 M). In FIG. 9, solid tangent lines were drawn to aid in estimation of the points where HER initiates for the electrodes, which are indicated by dashed vertical lines, which occur at ~420 mV for the Pt loaded electrode and at ~490 mV for the activated SWNT film with a remarkably low overpotential for the onset of only ~70 mV. The SWNT film displays a HER current of 22 mA/cm$^2$ at an overpotential of 1 V. The larger separation of the forward and reverse parts of the scan for the commercial Pt electrode reflects the larger non-Faradaic capacitive charging due to the greater surface area of the commercial electrode compared to the relatively compact SWNT film. As shown in FIG. 10, HER for the SWNTs in a 3 M pH 6.4 buffer displays an onset at an overpotential of only 30 mV and yields 38 mA/cm$^2$ of HER current at 1 V overpotential. The lower onset potential, relative to that for the 0.6 M pH 7.2 buffer, occurs because the higher salt concentration reduces the cell's IR drop, while stirring reduces effects due to concentration polarization. Increasing noise, at higher currents, is consistent with periodic disturbance of the bubbles that form at the film surface, as the "noise" stopped when the stirring was turned off. The switch to the higher current path corresponds to a large bubble being detached from the film surface.

Figure 11:
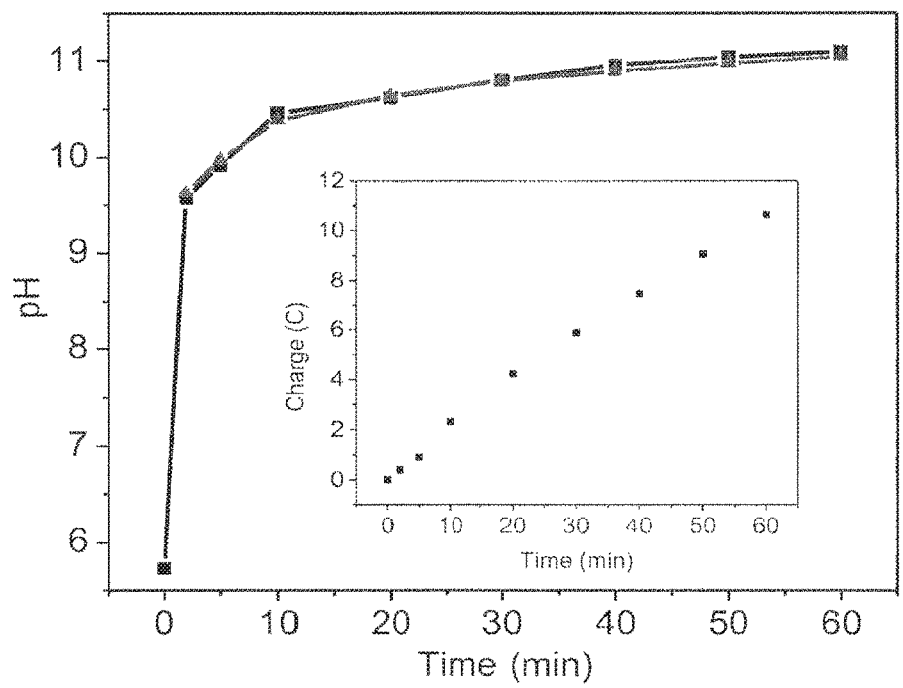
FIG. 11 shows the Faradaic efficiency for HER of the acid activated SWNTs comprising an electrode using a stirred unbuffered KCl solution at −1.4 V, where the measured pH values (squares) are contrasted with calculated pH values (triangles) for the solution based on the measured charge (inset).
Figure 12:
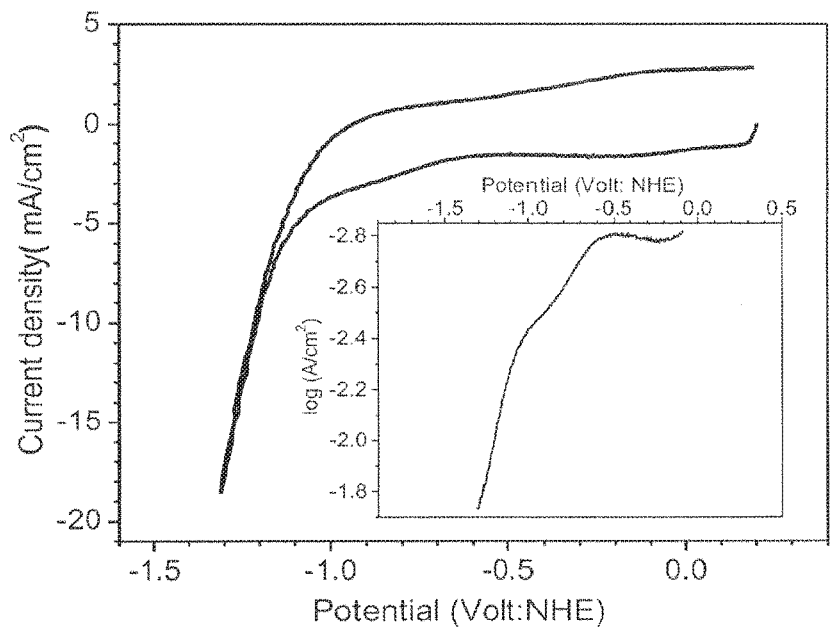
FIG. 12 shows a CV plot for an activated SWNT film (27 µg on a 5 mm diameter glassy carbon disk electrode, static measurement) for HER in filtered, additive free, Atlantic seawater (St. Augustine Beach, Fla.), according to an embodiment of the invention, where the inset shows the forward sweep of the current on a log scale to facilitate identification of the onset potential, −570 mV, indicating an overpotential of ~68 mV, as evaluated using the solution pH measured at the end of the CV measurement.
Figure 13:
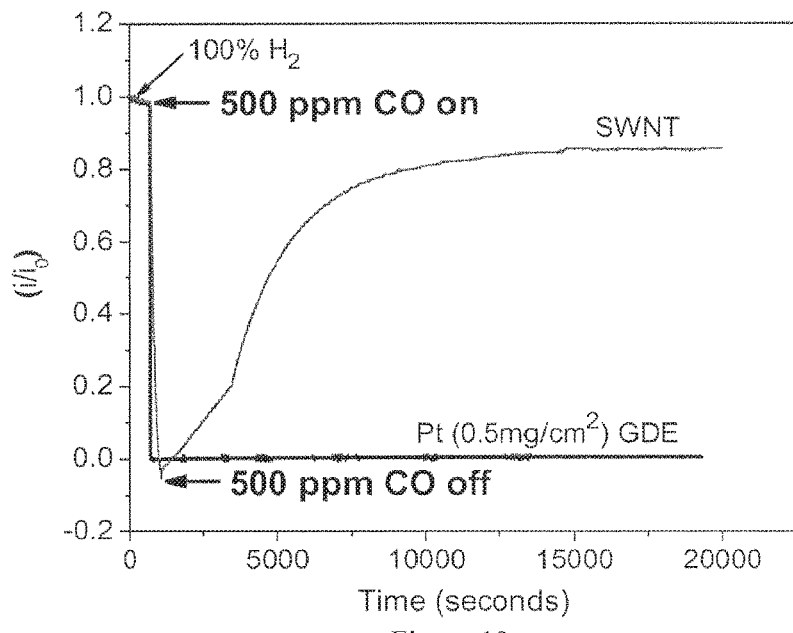
FIG. 13 shows the effect of CO exposure on the HOR for a Pt loaded GDE and an electrode comprising an acid activated SWNT film at 50 mV overpotential in 1 M $H_2SO_4$ where the rapid recovery of the SWNT HOR activity demonstrates that conventional metals are not responsible for catalytic activity, in accordance with the embodiment of the invention.

Table 1, below, compares the overpotential for reaction onset and the current density at the given overpotential at near neutral pH for the SWNT catalyst, according to an embodiment of the invention, with reported values for the best non-precious metal catalysts. A separate measurement of the pH change, in initially near neutral, non-buffered, 1 M KCl solution, confirms hydrogen evolution with 100% Faradaic efficiency. FIG. 11 shows the measured changes in pH with time (squares) and the calculated pH (triangles) based on the corresponding measured charge (inset), assuming that each pair of electrons corresponds to the evolution of one hydrogen molecule and a hydroxyl ion that raises the pH. Hydrogen evolution from filtered Atlantic seawater (without additives) is plotted in FIG. 12, demonstrating that the activated SWNT electrodes are tolerance to impurities and are robust.

grams (Beverskog et al., *Corros. Sci*, 1997, 39, 969-980 and Powell et al., *J. Chem. Educ.*, 1987, 64, 165-167), suggest these metals can only survive the SWNT purification (HNO$_3$ reflux), H$_2$SO$_4$ acid exposure, and the test conditions if encased in bucky-onions, that would render the metal surfaces inaccessible as the catalytic sites. Conclusive demonstration that conventional metals are responsible for the observed activity is shown in FIG. 13, where the carbon monoxide sensitivity of the HOR activity for the activated SWNTs is indicated. The HOR current normalized to the initial current, at 50 mV overpotential for the Pt loaded commercial GDE in 1 M H$_2$SO$_4$, displays poisoning upon the addition of 500 ppm CO to the hydrogen flowing through the gas plenum, where the electrode remains inactive after the CO flow is terminated and 100% H$_2$ feed is restored. The acid activated SWNT film shows deactivation with the very high CO concentration; however, after the CO flow is terminated and the 100% H$_2$ feed is restored, HOR activity immediately begins to recover. All conventional metal catalysts would have been rendered inactive by the CO exposure.

Figure 14A:
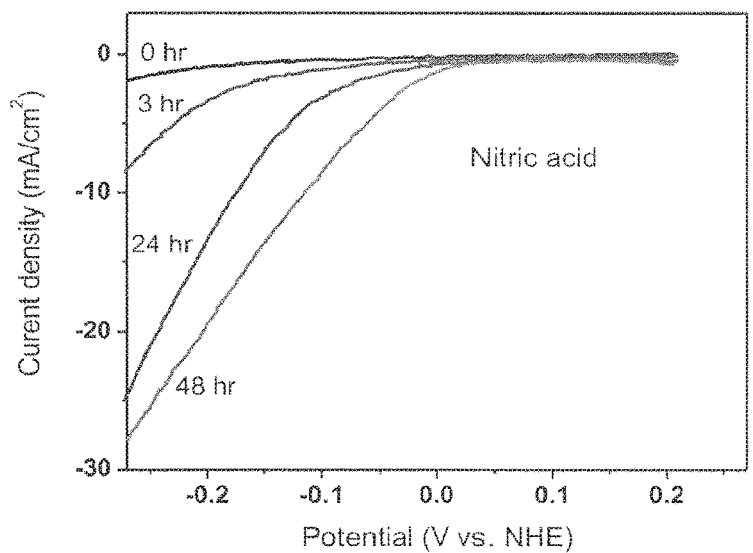
FIG. 14A shows CV plots for HER using films comprising SWNTs activated in 1 M nitric acid, according to an embodiment of the invention, with the HER currents measured at the indicated times.
Figure 14B:
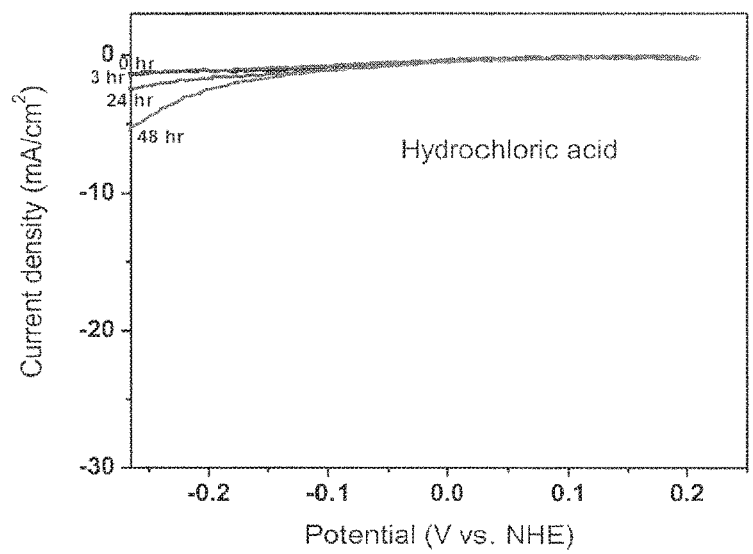
FIG. 14B shows CV plots for HER using films comprising SWNTs activated in 1 M hydrochloric acid, according to an embodiment of the invention, with the HER currents measured at the indicated times.
Figure 15:
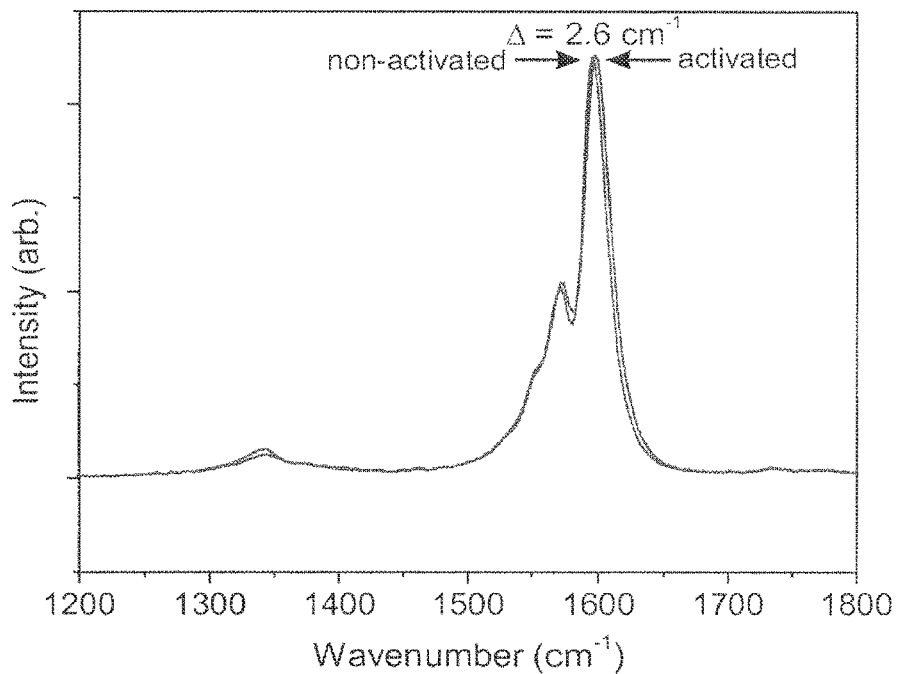
FIG. 15 shows overlapping Raman spectra of the D and G band regions for a nanotube film before and after acid activation, where spectra are normalized to the same G-band peak intensity.

Sulfuric acid is a known spontaneous "intercalant" in SWNTs bundles. To test whether intercalation is relevant to the activity enhancement, activation of samples was attempted in 1M HNO$_3$ and 1M HCl, the former, a known charge transfer intercalant of sp$^2$ bonded carbons while the latter is not. Acid exposure and low voltage cycling gave only a small increase of the HER currents in HCl while activation in the HNO$_3$ was comparable to that in the H$_2$SO$_4$, as shown in FIGS. 14A and 14B. Exposure to higher concentrations of HNO$_3$ (6M and 16M) greatly accelerated the rate of the activation. SWNTs exposed to 16M HNO$_3$ for 8 hrs and transferred to 1M HNO$_3$ for cycling and measurements attained saturation HER currents (for any given voltage) within 8 hrs in the 1M acid. Raman spectra of acid activated and non-activated SWNT samples are shown in FIG. 15. Spectra were recorded in a Renishaw Ramascope 1000, using 532 nm excitation and 1 mW power. Four spectra were recorded at distinct positions of the film within the region that had been exposed to the acid during cycling, the region bounded by the o-ring (activated region), and four spectra were recorded at distinct positions well outside the region defined by the o-ring (non-activated region). Besides a consistent peak upshift and a reduced D/G band ratio in the spectra from the activated region, the activated region spectra are consistently lower in intensity by a factor of ~1.6,

TABLE 1

Non-precious-metal HER overpotential for the onsets and activities near pH 7:

| Catalyst | Reaction onset Op$^a$ | Current density @ OP$^a$ | Reference |
|---|---|---|---|
| Nickel$^{II}$-cyclam | ~0.90 V | ~10 µA/cm$^2$ @ 1 V | b, c |
| Cobalt pentapyridine | 0.66 V | 2.4 mA/cm$^2$ @ 0.9 V | d |
| Molybdenum-oxo complex | 0.52 V | 9.1 mA/cm$^2$ @ 1 V | e |
| Activated SWNT | 0.03 V | 38 mA/cm$^2$ @ 1 V | |

$^a$overpotential;
b Collin et al., *Inorg. Chem.*, 1988, 27, 1986;
c Cook, et al., *Chem. Rev.*, 2010, 110, 6474;
d Sun, et al., *J. Am. Chem. Soc.* 2011, 133, 9212;
d Karunadasa et al. *Nature*, 2010, 464, 1329.

Transmission electron microscopy (TEM) images of purified SWNT material show an occasional opaque particle characteristic of nickel and cobalt metals, which are used as growth catalysts for SWNT synthesis. The quantity of the metals is below the detection limits (0.1 At. %) of an XPS measurement that was performed. Moreover, Pourbaix diaproviding further evidence for the intercalation, as the resonant Raman intensity depends on the real electronic transition rate, which is reduced by a partial ground state depletion upon charge transfer intercalation. Given the consistent differences between the spectra in the two regions, the four spectra common to each region were summed and normalized to the same g-band peak intensity giving the results shown in FIG. 15. The Raman spectra display an upshift in the G band of 2.6 cm$^{-1}$, consistent with a moderate degree of intercalation upon activation. The D/G band ratio in these samples shows a small decrease of the ratio in the activated sample, as is evident from the relative intensities of the D bands in FIG. 15 where the spectra were normalized to the same G band peak intensities. This Raman spectral evidence strongly indicates that the activation does not induce defects or effect chemical functionalization of the nanotube sidewalls. Although acid treatment might effect chemistry at the pre-existing nanotube ends and defects, the activity does not appear to require defects, as the activity observed for microcrystalline graphitic carbon films, which contain far more edge sites per volume than there are nanotube ends in the SWNT films, is not in excess of that observed for SWNT films.

Figure 16:
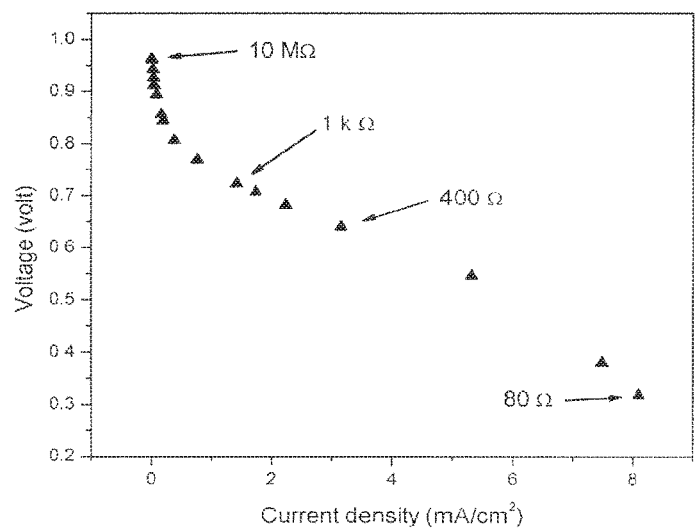
FIG. 16 is a polarization curve for an electrode comprising an acid treated SWNT film, according to an embodiment of the invention, used as an HOR anode in a hydrogen-air fuel cell, according to an embodiment of the invention.

The SWNT film was tested as a hydrogen oxidizing anode in a hydrogen-air fuel cell configuration in a two terminal mode employing an electrochemical cell using both sidewall openings and a second gas plenum cover. The 1.5 μm thick SWNT film on a PTFE membrane, disclosed above, was situated over one sidewall opening, and an air cathode was situated over the second sidewall opening. The air cathode consisted of a half membrane electrode assembly (MEA) with a Pt (1.0 mg/cm$^2$) loaded gas diffusion electrode painted with a Nafion solution subsequently bonded to one side of a Nafion 212 membrane. The Nafion membrane contacted the 1 M sulfuric acid electrolyte in the cell to serve as a barrier to cross-over of any unreacted gasses that made it through the two electrodes, which is a probable situation during testing under high impedance loading of the cell when low currents are drawn from the fuel cell. The SWNT film anode was fed H$_2$ gas flowing through its associated plenum at a low flow rate, while the MEA was simply exposed to air by leaving the fittings to its plenum open to the ambient environment. The anode was connected to the cathode through a variable resistor. Voltage across the resistor and current through the circuit was monitored as the resistance was decreased. FIG. 16 shows the resulting polarization curve constructed from the monitored voltage and resistance.

Figure 17:
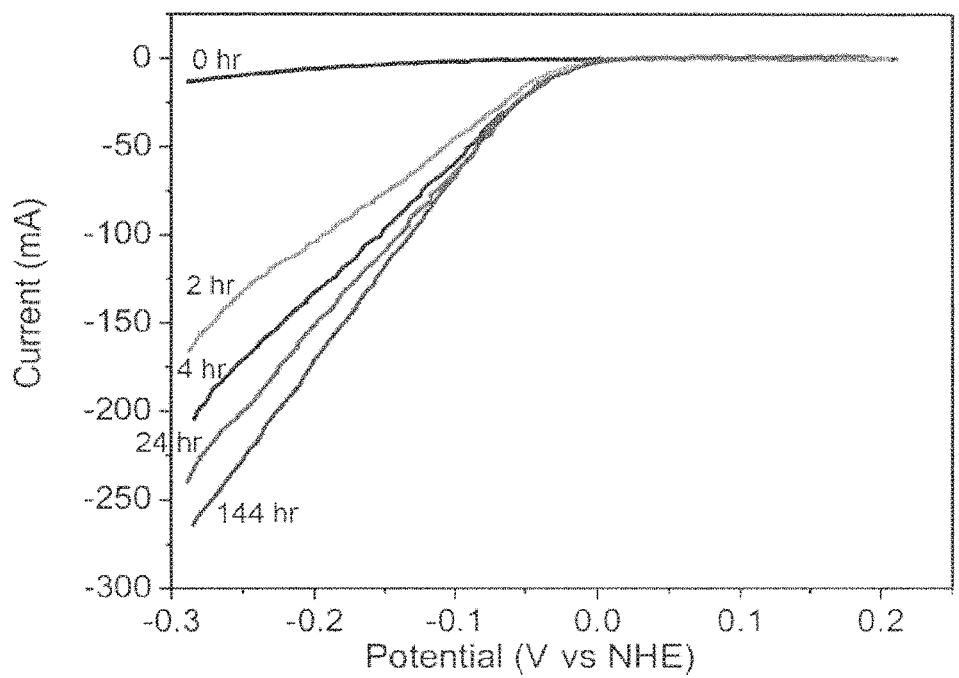
FIG. 17 shows CV plots for HER currents versus potential, as a function of time in 1 M nitric acid, for a piece of highly ordered pyrolytic graphite (HOPG) possessing a basal plane face area of 5.8 cm$^2$ and thickness of 0.23 mm, according to an embodiment of the invention.
Figure 18:
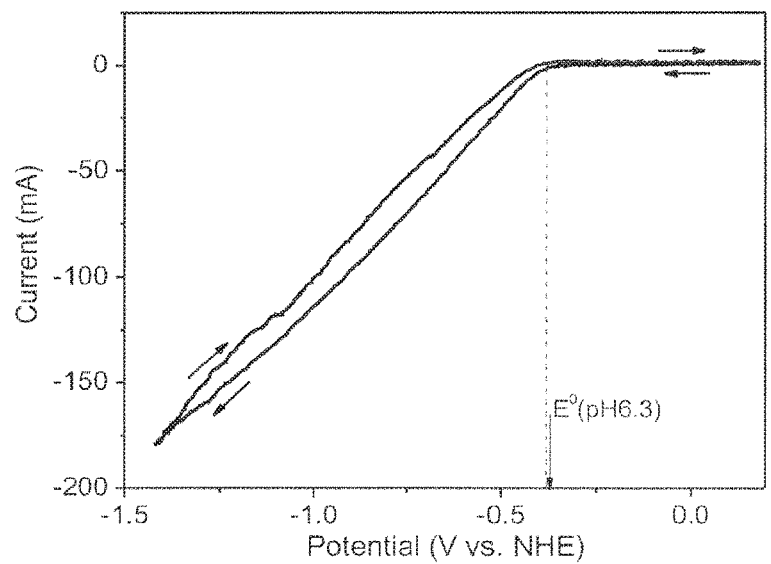
FIG. 18 shows CV plots for HER evolution current of an electrode comprising the activated piece of HOPG of FIG. 17, in pH 6.3 phosphate buffer (3 M) displaying a near zero onset overpotential (E°) for the reaction.
Figure 19:
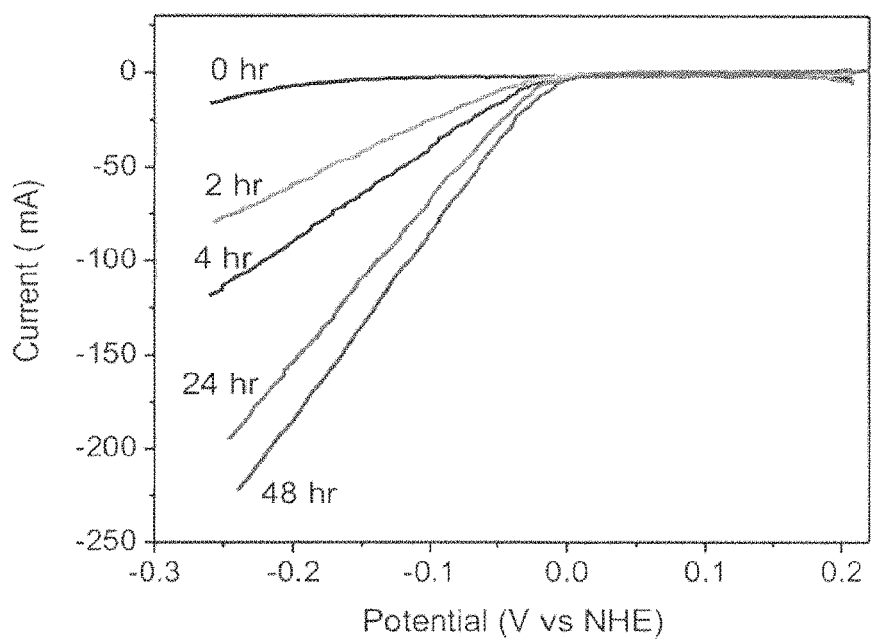
FIG. 19 shows CV plots for HER as a function of exposure time to 1 M nitric acid for a 3.18 mm diameter graphite electrode rod after exposure for 0, 2, 4, 24 and 48 hours.

Highly ordered pyrolytic graphite (HOPG) was examined to test the activity of other sp$^2$ carbon-comprising bodies, using random cuttings of high quality (low mosaic spread) HOPG, from the fabrication of X-ray monochromator crystals (Union Carbide, Ohio). Additionally, a microcrystalline graphitic rod was examined with a sample from Bay Carbon (grade ST-21), having impurities reported to be 1 ppm Si, and <1 ppm of Al, Ca, B, Fe and Mg. Evolution of the HER currents versus potential as a function of time in 1 M nitric acid for a piece of highly ordered pyrolytic graphite possessing a basal plane face area of 5.8 cm$^2$ and thickness of 0.23 mm is shown in FIG. 17. HER evolution current of the activated HOPG sample in pH 6.3 phosphate buffer (3 M) is shown in FIG. 18. Remarkably, the onset overpotential)(E° is nearly zero for the reaction at this pH. FIG. 19 shows the evolution of the HER currents versus potential as a function of time in 1 M nitric acid for a 3.18 mm diameter graphite electrode rod.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A first electrode for an electrochemical cell comprising:
   a carbon-comprising body having carbon material that has undergone a plurality of low voltage cathodic cycles in the presence of an acid and using a counter electrode that includes a transition metal, and wherein the first electrode is configured to perform a hydrogen evolution reaction (HER) and a hydrogen oxidation reaction (HOR).

2. The electrode of claim 1, wherein the transition metal is platinum (Pt).

3. The electrode of claim 1, wherein the carbon material comprises single-walled carbon nanotubes (SWNTs), double-walled carbon nanotubes (DWNTs), and/or multi-walled carbon nanotubes (MWNTs).

4. The electrode of claim 1, further comprising a porous membrane, wherein the porous membrane is configured to support the carbon-comprising body.

5. The electrode of claim 4, wherein the porous membrane comprises polytetrafluoroethylene (PTFE), polyvinylidene fluoride (PVDF), polyethylene, polypropylene, polyester, polyamide, or porous carbon paper.

6. The electrode of claim 4, wherein the carbon-comprising body is a film having a thickness of 20 nm to 100 μm.

7. The electrode of claim 1, further comprising a metal contact electrically coupled to the carbon-comprising body.

8. The electrode of claim 1, wherein the electrode has an onset overpotential of:
   less than 10 mV as measured in an electrolyte solution with a pH=1, and
   less than 70 mV as measured in an electrolyte solution with a pH=7.

9. The electrode of claim 1, wherein the plurality of low voltage cathodic cycles have a duration of at least 48 hours.

10. The electrode of claim 1, wherein the plurality of low voltage cathodic cycles includes voltage cycling within a range between voltage values that are a fraction of a volt (V).

11. An electrochemical device comprising at least one electrode according to claim 1.

12. An electrochemical cell comprising:
    an anode comprising the electrode of claim 1; and
    a cathode comprising a carbon-containing electrocatalyst configured to perform oxygen reduction.

* * * * *